(12) United States Patent
Bassi et al.

(10) Patent No.: US 11,519,076 B2
(45) Date of Patent: Dec. 6, 2022

(54) PRETREATMENT COMPOSITIONS, COATED ALUMINUM ALLOYS, AND METHODS OF MAKING THE SAME

(71) Applicant: Novelis Inc., Atlanta, GA (US)

(72) Inventors: Corrado Bassi, Salgesch (CH); Michèle Edith Berner, Sion (CH); Christoph Ernst Joseph Radermacher, Vevey (CH)

(73) Assignee: Novelis Inc., Atlanta, GA (US)

( * ) Notice: Subject to any disclaimer, the term of this patent is extended or adjusted under 35 U.S.C. 154(b) by 0 days.

(21) Appl. No.: 16/047,165

(22) Filed: Jul. 27, 2018

(65) Prior Publication Data

US 2019/0032225 A1    Jan. 31, 2019

Related U.S. Application Data

(60) Provisional application No. 62/599,873, filed on Dec. 18, 2017, provisional application No. 62/538,993, filed on Jul. 31, 2017.

(51) Int. Cl.
| | | |
|---|---|---|
| *C23C 22/48* | (2006.01) | |
| *C23C 22/56* | (2006.01) | |
| *C23F 11/18* | (2006.01) | |
| *C09D 5/08* | (2006.01) | |
| *C23C 22/68* | (2006.01) | |

(52) U.S. Cl.
CPC .............. *C23F 11/187* (2013.01); *C09D 5/08* (2013.01); *C23C 22/56* (2013.01); *C23C 22/68* (2013.01); *C23F 11/181* (2013.01); C23C 2222/20 (2013.01)

(58) Field of Classification Search
CPC .................................................. C23C 2222/20
See application file for complete search history.

(56) References Cited

U.S. PATENT DOCUMENTS

2001/0042491 A1 * 11/2001 Shimakura ............... C09D 4/00
                                                                    106/14.44
2006/0134339 A1   6/2006 Wang et al.
(Continued)

FOREIGN PATENT DOCUMENTS

CN    101115866       1/2008
CN    102153896    *  8/2011    .............. C09D 1/00
(Continued)

OTHER PUBLICATIONS

Chemetall, Permatreat 1003 A, Safety Data Sheet, Jul. 29, 2013.
(Continued)

*Primary Examiner* — Lois L Zheng
(74) *Attorney, Agent, or Firm* — Kilpatrick Townsend & Stockton LLP

(57) ABSTRACT

Described herein are pretreatment compositions, coated aluminum alloy products, and methods for coating the alloys. The pretreatment compositions include inorganic chemical corrosion inhibitors dispersed in a silane-based matrix and may further include clay particles. The inorganic chemical corrosion inhibitors include rare earth metals and salts thereof. The pretreatment compositions, when applied to the surface of an alloy, inhibit corrosion of the alloys. The pretreatment compositions can be used in automotive, electronics, industrial, transportation, and other applications.

7 Claims, 19 Drawing Sheets

(56) References Cited

U.S. PATENT DOCUMENTS

| | | | |
|---|---|---|---|
| 2012/0085261 A1* | 4/2012 | Barbe | C23F 11/185 |
| | | | 106/14.42 |
| 2013/0081950 A1 | 4/2013 | Okerberg et al. | |
| 2015/0252480 A1* | 9/2015 | Lapena Rey | C23C 22/361 |
| | | | 428/447 |
| 2016/0244637 A1* | 8/2016 | Guin | C09D 5/08 |

FOREIGN PATENT DOCUMENTS

| | | |
|---|---|---|
| CN | 102174289 | 9/2011 |
| CN | 102153896 | 2/2013 |
| CN | 102977774 | 3/2013 |
| CN | 103451641 | 12/2013 |
| CN | 103930495 | 7/2014 |
| CN | 104099593 | 10/2014 |
| CN | 105200408 | 12/2015 |
| CN | 105586587 | 5/2016 |
| CN | 106119724 | 11/2016 |
| EP | 1852523 | 11/2007 |
| JP | 2009523608 | 6/2009 |
| KR | 20160098171 | 8/2016 |
| WO | 2004009714 | 1/2004 |
| WO | 2006082946 | 8/2006 |
| WO | 2017016455 | 2/2017 |

OTHER PUBLICATIONS

Montemor et al., "Evaluation of self-healing ability in protective coatings modified with combinations of layered double hydroxides and cerium molibdate nanocontainers filled with corrosion inhibitors", Electrochimica Acta 60 (2012): 31-40.

Naderi et al., "Synergistic effect of clay nanoparticles and cerium component on the corrosion behavior of eco-friendly silane sol-gel layer applied on pure aluminum", Surface and Coatings Technology 224 (2013): 93-100.

Ooij et al., "Overview: The Potential of Silanes for Chromate Replacement in Metal Finishing Industries", Silicon Chemistry, vol. 3, Issue 1-2, Feb. 15, 2006, pp. 11-30.

Paussa et al., "ZrO2 sol-gel pre-treatments doped with cerium nitrate for the corrosion protection of AA6060", Progress in Organic Coatings 74.2 (2012): 311-319.

PCT/US2018/044032 , "International Search Report and Written Opinion", dated Oct. 15, 2018, 14 pages.

Serdechnova et al., "Active self-healing coating for galvanically coupled multi-material assemblies", Electrochemistry communications 41 (2014): 51-54.

Indian Application No. 202017003524, "First Examination Report", dated Jul. 28, 2020, 7 pages.

Canadian Application No. 3,071,688, Office Action, dated Apr. 15, 2021, 3 pages.

Chinese Application No. 201880048637.4, Office Action, dated Mar. 1, 2021, 18 pages.

Canadian Application No. 3,071,688, Office Action, dated Oct. 27, 2021, 3 pages.

Chinese Application No. 201880048637.4, Office Action, dated Oct. 27, 2021, 7 pages.

European Application No. 18753005.0, Office Action, dated Dec. 10, 2021, 7 pages.

Japanese Application No. 2020-505246, Notice of Allowance, dated Oct. 5, 2021, 6 pages.

Korean Application No. 10-2020-7005564, Office Action, dated Jan. 5, 2022, 17 pages.

Japanese Application No. 2020-505246, Office Action, dated Feb. 2, 2021, 10 pages.

Canadian Application No. 3,071,688, Office Action, dated Jun. 10, 2022, 3 pages.

Korean Application No. 10-2020-7005564, "Office Action", dated Jun. 27, 2022, 7 pages.

\* cited by examiner

PRETREATMENT COMPOSITIONS, COATED ALUMINUM ALLOYS, AND METHODS OF MAKING THE SAME

CROSS-REFERENCE TO RELATED APPLICATIONS

This application claims the benefit of U.S. Provisional Application Nos. 62/538,993, filed Jul. 31, 2017, and 62/599,873, filed Dec. 18, 2017, which are incorporated herein by reference in their entireties.

FIELD

The present disclosure relates to the fields of materials science, materials chemistry, surface science, metal manufacturing, aluminum alloys, and aluminum manufacturing. Compositions and methods are disclosed herein that can be employed in automotive, transportation, electronics, industrial, and other applications. The compositions and methods disclosed herein are particularly suitable for use in motor vehicles.

BACKGROUND

Aluminum alloys are often employed in environments that may subject the alloy to corrosion. Aluminum alloys are often joined with dissimilar metals or alloys during motor vehicle, electronics, industrial, and transportation fabrication processes. Joining aluminum alloys to dissimilar metals or alloys can induce galvanic corrosion increasing corrosion risk. For example, when two dissimilar metals with dissimilar electrode potentials are joined together by physical or chemical means (e.g., welding an aluminum alloy to steel) and exposed to an electrolyte (e.g., impure water), one metal can act as an anode and the other can act as a cathode, forming a galvanic couple. In this galvanic couple, one metal preferentially corrodes and this galvanic coupling will speed up the corrosion process leading to faster corrosion than it does in the absence of the contacting dissimilar metal. The anode metal or alloy dissolves into the electrolyte, can form corrosion products on the metal surface, or in some cases deposits back on the cathodic areas. This dissolving can result in failure of the joint.

Joining aluminum alloys with dissimilar metals can be done several ways, including adhesives, rivets, screws, or other mechanical joining elements. For example, one way of joining aluminum alloys with dissimilar metals and alloys (i.e., galvanized steel) is to bond the metals together using epoxy-based adhesives. The area where both materials overlap is critical regarding corrosion because the materials are in direct contact, particularly in regions with missing adhesive (or, likewise, in regions where the materials are in contact through rivets, screws or other mechanical joining elements). The combination is prone to galvanic corrosion.

Prior efforts to prevent galvanic corrosion have been impractical. These methods include electrical insulation, electrolytic insulation, grounding, electroplating, applying a sacrificial anode, and/or supplying a direct current to the bonded dissimilar metals. Electrical insulation employs extraneous materials (e.g., polymers) that weaken the bond between the dissimilar metals. Electrolytic insulation requires cumbersome encapsulation of the bonded area. Grounding is impractical in transportation and/or motor vehicle applications. Electroplating requires the use of expensive metals and processing steps. Employing a sacrificial anode within the bond is costly and temporary. Applying a continuous current to the bonded area is highly inefficient. A current method used by the automotive industry is to isolate the bonded areas with sealants and waxes so that no liquid can enter the area where both metals overlap. This technology, though very efficient, generates high costs for the automotive industry. There remains a need for cost efficient methods of inhibiting corrosion where two dissimilar metals are joined together, especially because mixed material joints are increasingly present in motor vehicle manufacturing.

SUMMARY

Covered embodiments of the invention are defined by the claims, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification, any or all drawings, and each claim.

Described herein are pretreatment compositions for pretreating an aluminum alloy. The pretreatment compositions described herein comprise at least one rare earth metal or salt thereof and a solution containing at least one silane. Optionally, the at least one silane is dispersed or dissolved in water. The at least one rare earth metal or salt thereof can be present in an amount of from about 50 ppm to about 7500 ppm. The solution containing the at least one silane can be present in an amount of from about 5 vol. % to about 50 vol. %. Optionally, the at least one rare earth metal or salt thereof comprises at least one of cerium, yttrium, ytterbium, or lanthanum. Optionally, the at least one rare earth metal or salt thereof comprises cerium (III) nitrate. In some cases, the cerium (III) nitrate can be present in an amount of about 500 ppm and the solution containing the at least one silane can be present in an amount of about 10 vol. %. Optionally, the pretreatment composition further comprises clay particles.

Also described herein are aluminum alloys comprising a surface coating. The surface coating comprises at least one rare earth metal or salt thereof dispersed in a matrix comprising at least one silane. Optionally, the at least one rare earth metal or salt thereof is present in an amount of from about 50 ppm to about 3000 ppm (e.g., from greater than about 100 ppm to less than about 3000 ppm). Optionally, the at least one rare earth metal or salt thereof comprises cerium, yttrium, ytterbium, lanthanum, or combinations thereof. In some cases, the at least one rare earth metal or salt thereof comprises cerium (III) nitrate. Optionally, the at least one silane in the matrix comprises at least one of (3-aminopropyl)triethoxysilane, 1,2-bis(triethoxysilyl)ethane, glycidyloxypropyl-trimethoxysilane, tetraethoxysilane, vinyltriethoxysilane, bis[3-(trimethoxysilyppropyl]amine, vinyltrimethoxysilane, and methyltriethoxysilane.

The surface coating can further comprise an inorganic barrier-type corrosion inhibitor. Optionally, the inorganic barrier-type corrosion inhibitor comprises clay particles, such as montmorillonite (MMT).

The aluminum alloy can comprise a 1xxx series alloy, a 2xxx series alloy, a 3xxx series alloy, a 4xxx series alloy, a 5xxx series alloy, a 6xxx series alloy, a 7xxx series alloy, or an 8xxx series alloy. Silicon can be present on a surface of the alloy in an amount of from about 2 mg/m$^2$ to about 35 mg/m$^2$.

Also described herein are joined structures. A joined structure as described herein comprises an aluminum alloy comprising a surface coating as described herein and a metal or an alloy. The metal or alloy joined with the aluminum alloy can differ in composition from the aluminum alloy described herein.

Further described herein are methods of treating an aluminum alloy, such as an aluminum alloy sheet. The methods of treating an aluminum alloy can comprise applying the pretreatment composition as described herein to a surface of the aluminum alloy to form an initial coating layer. The applying step can comprise roll coating or spray coating the alloy. Optionally, the method further comprises curing the initial coating layer to provide a coated alloy.

Other objects and advantages will be apparent from the following detailed description of non-limiting examples and figures.

DETAILED DESCRIPTION

Figure 1:
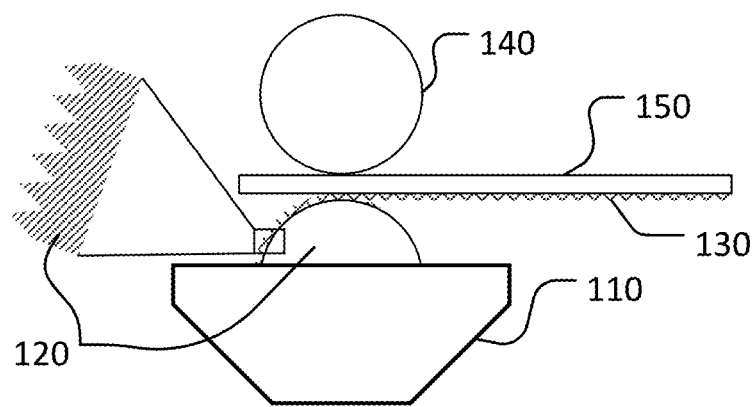
FIG. 1 is a schematic illustration of a roll coater deposition process.

Provided herein are pretreatment compositions that impart corrosion resistance to metals and alloys (e.g., aluminum alloys). Also provided herein are aluminum alloys coated with the disclosed pretreatment compositions and methods for applying the disclosed pretreatment compositions to aluminum alloys. Pretreatment, as used herein, refers to a surface modification, typically in the form of a solution or suspension that is applied and converted to a layer through physical and/or chemical reactions. The layer imparts characteristics and performance qualities that tend to be significantly different from the bulk of the metal or the metal surface. For example, the pretreatment compositions and methods described herein provide improved corrosion resistance to alloy surfaces as compared to non-pretreated alloy surfaces. In addition, the disclosed coatings and methods improve the galvanic corrosion resistance of aluminum and aluminum alloys when put in direct contact with dissimilar metals and alloys, for example, in automotive joints. Unexpectedly, the pretreatment compositions described herein provide enhanced corrosion resistance properties while incorporating lower amounts of the pretreatment compositions than amounts used in primer coatings that are typically used to prevent corrosion. In some examples, the amount of pretreatment used is reduced approximately 10 to 100 times as compared to primer coatings usually used to prevent corrosion. These unexpected effects result in thinner pretreatment coatings, which in turn reduces the costs associated with imparting corrosion resistance to alloys.

Definitions and Descriptions:

The terms "invention," "the invention," "this invention," and "the present invention" used herein are intended to refer broadly to all of the subject matter of this patent application and the claims below. Statements containing these terms should be understood not to limit the subject matter described herein or to limit the meaning or scope of the patent claims below.

In this description, reference is made to alloys identified by aluminum industry designations, such as "series" or "6xxx." For an understanding of the number designation system most commonly used in naming and identifying aluminum and its alloys, see "International Alloy Designations and Chemical Composition Limits for Wrought Aluminum and Wrought Aluminum Alloys" or "Registration Record of Aluminum Association Alloy Designations and Chemical Compositions Limits for Aluminum Alloys in the Form of Castings and Ingot," both published by The Aluminum Association.

As used herein, the meaning of "a," "an," or "the" includes singular and plural references unless the context clearly dictates otherwise.

All ranges disclosed herein are to be understood to encompass any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more, e.g., 1 to 6.1, and ending with a maximum value of 10 or less, e.g., 5.5 to 10.

As used herein, terms such as "cast aluminum alloy product," "cast metal product," "cast product," and the like are interchangeable and refer to a product produced by direct chill casting (including direct chill co-casting) or semi-continuous casting, continuous casting (including, for example, by use of a twin belt caster, a twin roll caster, a block caster, or any other continuous caster), electromagnetic casting, hot top casting, or any other casting method.

As used herein, a plate generally has a thickness of greater than about 15 mm. For example, a plate may refer to an aluminum product having a thickness of greater than about 15 mm, greater than about 20 mm, greater than about 25 mm, greater than about 30 mm, greater than about 35 mm, greater than about 40 mm, greater than about 45 mm, greater than about 50 mm, or greater than about 100 mm.

As used herein, a shate (also referred to as a sheet plate) generally has a thickness of from about 4 mm to about 15 mm. For example, a shate may have a thickness of about 4 mm, about 5 mm, about 6 mm, about 7 mm, about 8 mm, about 9 mm, about 10 mm, about 11 mm, about 12 mm, about 13 mm, about 14 mm, or about 15 mm.

As used herein, a sheet generally refers to an aluminum product having a thickness of less than about 4 mm. For example, a sheet may have a thickness of less than about 4 mm, less than about 3 mm, less than about 2 mm, less than about 1 mm, less than about 0.5 mm, less than about 0.3 mm, or less than about 0.1 mm.

Reference is made in this application to alloy temper or condition. For an understanding of the alloy temper descriptions most commonly used, see "American National Standards (ANSI) H35 on Alloy and Temper Designation Systems." An F condition or temper refers to an aluminum alloy as fabricated. An O condition or temper refers to an aluminum alloy after annealing. An Hxx condition or temper, also referred to herein as an H temper, refers to a non-heat treatable aluminum alloy after cold rolling with or without thermal treatment (e.g., annealing). Suitable H tempers include HX1, HX2, HX3 HX4, HX5, HX6, HX7, HX8, or HX9 tempers. A T1 condition or temper refers to an aluminum alloy cooled from hot working and naturally aged (e.g., at room temperature). A T2 condition or temper refers to an aluminum alloy cooled from hot working, cold worked and naturally aged. A T3 condition or temper refers to an aluminum alloy solution heat treated, cold worked, and naturally aged. A T4 condition or temper refers to an aluminum alloy solution heat treated and naturally aged. A T5 condition or temper refers to an aluminum alloy cooled from hot working and artificially aged (at elevated temperatures). A T6 condition or temper refers to an aluminum alloy solution heat treated and artificially aged. A T7 condition or temper refers to an aluminum alloy solution heat treated and artificially overaged. A T8x condition or temper refers to an aluminum alloy solution heat treated, cold worked, and artificially aged. A T9 condition or temper refers to an aluminum alloy solution heat treated, artificially aged, and cold worked. A W condition or temper refers to an aluminum alloy after solution heat treatment.

As used herein, the meaning of "room temperature" can include a temperature of from about 15° C. to about 30° C., for example about 15° C., about 16° C., about 17° C., about 18° C., about 19° C., about 20° C., about 21° C., about 22° C., about 23° C., about 24° C., about 25° C., about 26° C., about 27° C., about 28° C., about 29° C., or about 30° C.

The following aluminum alloys are described in terms of their elemental composition in weight percentage (wt. %) based on the total weight of the alloy. In certain examples of each alloy, the remainder is aluminum, with a maximum wt. % of 0.15% for the sum of the impurities.

Pretreatment Compositions:

Described herein are pretreatment compositions that impart corrosion resistance to metals and alloys. The pretreatment compositions include one or more galvanic corrosion inhibitors, a solution containing at least one silane, and optionally, one or more additional components. The galvanic corrosion inhibitors can include, for example, inorganic chemical corrosion inhibitors, inorganic barrier-type corrosion inhibitors, organic corrosion inhibitors, or any combination thereof. The pretreatment composition components are further described below.

Inorganic Chemical Corrosion Inhibitors

The pretreatment compositions described herein include one or more inorganic chemical corrosion inhibitors. The inorganic chemical corrosion inhibitors for use in the pretreatment compositions include any inorganic chemical species capable of chemically inhibiting or preventing corrosion of an aluminum alloy, such as by reacting in some way to form a different chemical (e.g., an oxide) on the surface of the alloy and/or providing additional protection to the surface metal by being embedded in the coating.

In some examples, the inorganic chemical corrosion inhibitors as described herein include one or more rare earth metals or salts thereof. Suitable rare earth metals for use as inorganic chemical corrosion inhibitors can include, for example, cerium (Ce), scandium (Sc), yttrium (Y), lanthanum (La), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), and lutetium (Lu).

Optionally, the inorganic chemical corrosion inhibitor is a rare earth metal salt. Optionally, the rare earth metal salt includes a rare earth metal in an oxidation state of +1, +2, +3, +4, +5, or +6. For example, the rare earth metal salt can be a cerium salt that includes cerium II ions, cerium III ions, or cerium IV ions. In some examples, the salt is cerium (III) nitrate ($Ce(NO_3)_3$).

In some cases, the rare earth metal salt can be an anhydrous salt. In some cases, the rare earth metal salt can be a hydrated salt, for example, a monohydrate salt, a dihydrate salt, a trihydrate salt, a tetrahydrate salt, a pentahydrate salt, a hexahydrate salt, a heptahydrate salt, an octahydrate salt, a nonahydrate salt, and/or a decahydrate salt. In some examples, the rare earth metal salt is a rare earth metal nitrate. Examples of suitable inorganic chemical corrosion inhibitors include cerium (III) nitrate hexahydrate ($Ce(NO_3)_3 \cdot 6H_2O$), yttrium nitrate hexahydrate ($Y(NO_3)_3 \cdot 6H_2O$), ytterbium nitrate hexahydrate ($Yb(NO_3)_3 \cdot 6H_2O$), and lanthanum nitrate hexahydrate ($La(NO_3)_3 \cdot 6H_2O$).

The inorganic chemical corrosion inhibitor can be present in the pretreatment composition in an amount of at least about 50 ppm (for example, at least about 75 ppm, at least about 100 ppm, at least about 500 ppm, or at least about 1000 ppm). In some examples, the amount of inorganic chemical corrosion inhibitor in the pretreatment composition is from about 50 ppm to about 7500 ppm (e.g., from about 50 ppm to about 5000 ppm, from about 75 ppm to about 3000 ppm, from about 100 ppm to about 2000 ppm, from about 150 ppm to about 1000 ppm, or from about 200 ppm to about 500 ppm) or any value in between. For example, the amount of inorganic chemical corrosion inhibitor can be about 50 ppm, about 100 ppm, about 150 ppm, about 200 ppm, about 250 ppm, about 300 ppm, about 350 ppm, about 400 ppm, about 450 ppm, about 500 ppm, about 550 ppm, about 600 ppm, about 650 ppm, about 700 ppm, about 750 ppm, about 800 ppm, about 850 ppm, about 900 ppm, about 950 ppm, about 1000 ppm, about 1050 ppm, about 1100 ppm, about 1150 ppm, about 1200 ppm, about 1250 ppm, about 1300 ppm, about 1350 ppm, about 1400 ppm, about 1450 ppm, about 1500 ppm, about 1550 ppm, about 1600 ppm, about 1650 ppm, about 1700 ppm, about 1750 ppm, about 1800 ppm, about 1850 ppm, about 1900 ppm, about 1950 ppm, about 2000 ppm, about 2050 ppm, about 2100 ppm, about 2150 ppm, about 2200 ppm, about 2250 ppm, about 2300 ppm, about 2350 ppm, about 2400 ppm, about 2450 ppm, about 2500 ppm, about 2550 ppm, about 2600 ppm, about 2650 ppm, about 2700 ppm, about 2750 ppm, about 2800 ppm, about 2850 ppm, about 2900 ppm, about 2950 ppm, about 3000 ppm, about 3050 ppm, about 3100 ppm, about 3150 ppm, about 3200 ppm, about 3250 ppm, about 3300 ppm, about 3350 ppm, about 3400 ppm, about 3450 ppm, about 3500 ppm, about 3550 ppm, about 3600 ppm, about 3650 ppm, about 3700 ppm, about 3750 ppm, about 3800 ppm, about 3850 ppm, about 3900 ppm, about 3950 ppm, about 4000 ppm, about 4050 ppm, about 4100 ppm, about 4150 ppm, about 4200 ppm, about 4250 ppm, about 4300 ppm, about 4350 ppm, about 4400 ppm, about 4450 ppm, about 4500 ppm, about 4550 ppm, about 4600 ppm, about 4650 ppm, about 4700 ppm, about 4750 ppm, about 4800 ppm, about 4850 ppm, about 4900 ppm, about 4950 ppm, about 5000 ppm, about 5050 ppm, about 5100 ppm, about 5150 ppm, about 5200 ppm, about 5250 ppm, about 5300 ppm, about 5350 ppm, about 5400 ppm, about 5450 ppm, about 5500 ppm, about 5550 ppm, about 5600 ppm, about 5650 ppm, about 5700 ppm, about 5750 ppm, about 5800 ppm, about 5850 ppm, about 5900 ppm, about 5950 ppm, about 6000 ppm, about 6050 ppm, about 6100 ppm, about 6150 ppm, about 6200 ppm, about 6250 ppm, about 6300 ppm, about 6350 ppm, about 6400 ppm, about 6450 ppm, about 6500 ppm, about 6550 ppm, about 6600 ppm, about 6650 ppm, about 6700 ppm, about 6750 ppm, about 6800 ppm, about 6850 ppm, about 6900 ppm, about 6950 ppm, or about 7000 ppm.

The preferred amount of inorganic chemical corrosion inhibitor will depend on the identity of the corrosion inhibitor. For example, cerium present in an amount of about 500 ppm may provide comparable corrosion inhibition equivalent to a different amount of another corrosion inhibitor, such as yttrium or lanthanum. In a further example, yttrium present in an amount of about 1000 ppm may provide comparable corrosion inhibition equivalent to a different amount of another corrosion inhibitor, such as ytterbium or europium. In a still further example, ytterbium present in an amount of about 1000 ppm may provide comparable corrosion inhibition equivalent to a different amount of another corrosion inhibitor, such as terbium or holmium. In some examples, the inorganic chemical corrosion inhibitor is effective at low levels and need not exceed, for example, 500 ppm-1000 ppm.

Silane-Containing and Ti/Zr-Containing Solutions

The pretreatment compositions described herein include at least one silane. Suitable silanes for use in the pretreatment compositions can include, for example, (3-aminopropyl)triethoxysilane (APS), 1,2-bis(triethoxysilyl)ethane (BTSE), glycidyl-oxypropyl-trimethoxysilane (GPS), tetraethoxysilane (TEOS), vinyltriethoxysilane (VTES), bis[3-(trimethoxysilyl)propyl]amine, vinyltrimethoxysilane, methyltriethoxysilane (MTES), and combinations of these. Optionally, a titanium/zirconium (Ti/Zr) mixture can be used in place of the silane in the silane-containing solution, to form a Ti/Zr-containing solution. The Ti/Zr-containing solution can include Ti/Zr in amounts of 0 to about 100 mg/m$^2$ (e.g., from about 1 to about 75 mg/m$^2$, from about 2 to about 50 mg/m$^2$, or from about 5 to about 25 mg/m$^2$). The solution containing at least one silane and/or Ti/Zr form the matrix material on the pretreatment composition-treated alloy, as further described below. The at least one silane and Ti/Zr are also referred to herein as matrix components.

The silane can be introduced to the pretreatment composition as a solution containing at least one silane and an aqueous medium, an organic solvent, or a combination of these. The aqueous medium can include, for example, tap water, purified water, distilled water, and/or deionized water. The water can be distilled and/or deionized to a purity of from about 0.5 µS/cm to about 40 µS/cm (e.g., from about 1.0 µS/cm to about 30 µS/cm or from about 5.0 µS/cm to about 25 µS/cm). Suitable organic solvents include, for example, polar organic solvents. In some examples, organic solvents such as acetone, ethanol, methanol, isopropanol, and/or ethyl acetate can be present. Optionally, the solution containing at least one silane includes a combination of aqueous media and organic solvents. In some examples, the aqueous medium or media can be present in the solution in an amount of at least about 5 vol. %, at least about 10 vol. %, at least about 15 vol. %, at least about 20 vol. %, at least about 25 vol. %, at least about 30 vol. %, at least about 35 vol. %, at least about 40 vol. %, at least about 45 vol. %, at least about 50 vol. %, at least about 55 vol. %, at least about 60 vol. %, at least about 65 vol. %, at least about 70 vol. %, at least about 75 vol. %, at least about 80 vol. %, at least about 85 vol. %, at least about 90 vol. %, or at least about 95 vol. %. In some examples, the organic solvent(s) can be present in the solution in an amount of at least about 5 vol. %, at least about 10 vol. %, at least about 15 vol. %, at least about 20 vol. %, at least about 25 vol. %, at least about 30 vol. %, at least about 35 vol. %, at least about 40 vol. %, at least about 45 vol. %, at least about 50 vol. %, at least about 55 vol. %, at least about 60 vol. %, at least about 65 vol. %, at least about 70 vol. %, at least about 75 vol. %, at least about 80 vol. %, at least about 85 vol. %, at least about 90 vol. %, or at least about 95 vol. %. Optionally, the silane-containing solution is an aqueous medium that can include, for example, acetone, ethanol, methanol, isopropanol, and/or ethyl acetate in amounts of up to about 90 vol. % (e.g., up to about 85 vol. %, up to about 80 vol. %, up to about 75 vol. %, up to about 70 vol. %, up to about 65 vol. %, up to about 60 vol. %, up to about 55 vol. %, up to about 50 vol. %, up to about 45 vol. %, up to about 40 vol. %, up to about 35 vol. %, up to about 30 vol. %, up to about 25 vol. %, up to about 20 vol. %, up to about 15 vol. %, or up to about 10 vol. %).

Additional Components

The pretreatment compositions can further include one or more additional components, including inorganic barrier-type corrosion inhibitors. In contrast to the inorganic chemical corrosion inhibitors described herein, the inorganic barrier-type inhibitors can stabilize a coating resulting from the pretreatment composition (i.e., making the resulting coating more inert to reaction) by creating a stronger silane network and denser structure. A stronger and denser coating, in turn, resists corrosion. In some examples, the inorganic barrier-type corrosion inhibitors can be clay particles of any type. Clay particles can inhibit corrosion by reinforcing the silane matrix and producing a surface that is more resistive to corrosion attack as compared to an untreated surface. A non-limiting example of a suitable type of clay particle for use as the inorganic barrier-type inhibitor is montmorillonite (MMT). Optionally, cerium (Ce) functions as an inorganic barrier-type corrosion inhibitor, in addition to functioning as an inorganic chemical corrosion inhibitor as described above.

The inorganic chemical corrosion inhibitor and the inorganic barrier-type corrosion inhibitor can function in concert to enhance the corrosion resistance. In some examples, cerium and clay particles are present in the pretreatment compositions. The cerium corrosion inhibitor precipitates as oxide and hydroxide species on the cathodic areas of the corroding metal or alloy, forming a cerium-rich layer on the metal or alloy. The clay particles prevent corrosion by densifying the silane matrix and/or by physically and/or chemically attaching to the surface while the rare earth metal is driven electrochemically to form the barrier layer.

The amount of inorganic barrier-type corrosion inhibitor in the pretreatment composition can be from about 50 ppm to about 5000 ppm (e.g., from about 50 ppm to about 4000 ppm, from about 75 ppm to about 3000 ppm, from about 100 ppm to about 2000 ppm, or from about 500 ppm to about 1500 ppm) or any value in between. For example, the amount of inorganic barrier-type corrosion inhibitor can be about 50 ppm, about 100 ppm, about 150 ppm, about 200 ppm, about 250 ppm, about 300 ppm, about 350 ppm, about 400 ppm, about 450 ppm, about 500 ppm, about 550 ppm, about 600 ppm, about 650 ppm, about 700 ppm, about 750 ppm, about 800 ppm, about 850 ppm, about 900 ppm, about 950 ppm, about 1000 ppm, about 1050 ppm, about 1100 ppm, about 1150 ppm, about 1200 ppm, about 1250 ppm, about 1300 ppm, about 1350 ppm, about 1400 ppm, about 1450 ppm, about 1500 ppm, about 1550 ppm, about 1600 ppm, about 1650 ppm, about 1700 ppm, about 1750 ppm, about 1800 ppm, about 1850 ppm, about 1900 ppm, about 1950 ppm, about 2000 ppm, about 2050 ppm, about 2100 ppm, about 2150 ppm, about 2200 ppm, about 2250 ppm, about 2300 ppm, about 2350 ppm, about 2400 ppm, about 2450 ppm, about 2500 ppm, about 2550 ppm, about 2600 ppm, about 2650 ppm, about 2700 ppm, about 2750 ppm, about 2800 ppm, about 2850 ppm, about 2900 ppm, about 2950 ppm, about 3000 ppm, about 3050 ppm, about 3100 ppm, about 3150 ppm, about 3200 ppm, about 3250 ppm, about 3300 ppm, about 3350 ppm, about 3400 ppm, about 3450 ppm, about 3500 ppm, about 3550 ppm, about 3600 ppm, about 3650 ppm, about 3700 ppm, about 3750 ppm, about 3800 ppm, about 3850 ppm, about 3900 ppm, about 3950 ppm, about 4000 ppm, about 4050 ppm, about 4100 ppm, about 4150 ppm, about 4200 ppm, about 4250 ppm, about 4300 ppm, about 4350 ppm, about 4400 ppm, about 4450 ppm, about 4500 ppm, about 4550 ppm, about 4600 ppm, about 4650 ppm, about 4700 ppm, about 4750 ppm, about 4800 ppm, about 4850 ppm, about 4900 ppm, about 4950 ppm, or about 5000 ppm.

The pretreatment compositions can optionally include organic corrosion inhibitors. Non-limiting examples of suitable organic corrosion inhibitors include mercaptobenzothiazole (MBT), benzotriazole (BTA), salicylaldoxime, dithiooxamide, quinaldic acid, thioacetamide, 8-hydroxyquinoline (HXQ), and mixtures thereof. The amount of organic corrosion inhibitor in the pretreatment composition can be from about 50 to about 5000 ppm (e.g., from about 50 ppm to about 4000 ppm, from about 75 ppm to about 3000 ppm, from about 100 ppm to about 2000 ppm, or from about 500 ppm to about 1500 ppm) or any value in between. For example, the amount of inorganic barrier-type corrosion inhibitor can be about 50 ppm, about 100 ppm, about 150 ppm, about 200 ppm, about 250 ppm, about 300 ppm, about 350 ppm, about 400 ppm, about 450 ppm, about 500 ppm, about 550 ppm, about 600 ppm, about 650 ppm, about 700 ppm, about 750 ppm, about 800 ppm, about 850 ppm, about 900 ppm, about 950 ppm, about 1000 ppm, about 1050 ppm, about 1100 ppm, about 1150 ppm, about 1200 ppm, about 1250 ppm, about 1300 ppm, about 1350 ppm, about 1400 ppm, about 1450 ppm, about 1500 ppm, about 1550 ppm, about 1600 ppm, about 1650 ppm, about 1700 ppm, about 1750 ppm, about 1800 ppm, about 1850 ppm, about 1900 ppm, about 1950 ppm, about 2000 ppm, about 2050 ppm, about 2100 ppm, about 2150 ppm, about 2200 ppm, about 2250 ppm, about 2300 ppm, about 2350 ppm, about 2400 ppm, about 2450 ppm, about 2500 ppm, about 2550 ppm, about 2600 ppm, about 2650 ppm, about 2700 ppm, about 2750 ppm, about 2800 ppm, about 2850 ppm, about 2900 ppm, about 2950 ppm, about 3000 ppm, about 3050 ppm, about 3100 ppm, about 3150 ppm, about 3200 ppm, about 3250 ppm, about 3300 ppm, about 3350 ppm, about 3400 ppm, about 3450 ppm, about 3500 ppm, about 3550 ppm, about 3600 ppm, about 3650 ppm, about 3700 ppm, about 3750 ppm, about 3800 ppm, about 3850 ppm, about 3900 ppm, about 3950 ppm, about 4000 ppm, about 4050 ppm, about 4100 ppm, about 4150 ppm, about 4200 ppm, about 4250 ppm, about 4300 ppm, about 4350 ppm, about 4400 ppm, about 4450 ppm, about 4500 ppm, about 4550 ppm, about 4600 ppm, about 4650 ppm, about 4700 ppm, about 4750 ppm, about 4800 ppm, about 4850 ppm, about 4900 ppm, about 4950 ppm, or about 5000 ppm.

Optionally, the pretreatment compositions can further include one or more additives such as adhesives, pigments, and/or surfactants.

The pretreatment compositions described herein can be prepared by combining an inorganic chemical corrosion inhibitor as described herein, a solution containing at least one silane as described herein, and one or more additional components (e.g., an inorganic barrier-type corrosion inhibitor or an organic corrosion inhibitor) as described herein. The components can be combined with an aqueous and/or solvent based medium. The aqueous medium can include tap water, purified water, distilled water, and/or deionized water. The water can be distilled and/or deionized to a purity of from about 0.5 µS/cm to about 40 µS/cm, as described above. Optionally, in addition to water, the aqueous medium can include one or more polar organic solvents. For example, the aqueous medium can include acetone, ethanol, methanol, isopropanol, and/or ethyl acetate in amounts of up to about 90 vol. % (e.g., up to about 85 vol. %, up to about 80 vol. %, up to about 75 vol. %, up to about 70 vol. %, up to about 65 vol. %, up to about 60 vol. %, up to about 55 vol. %, up to about 50 vol. %, up to about 45 vol. %, up to about 40 vol. %, up to about 35 vol. %, up to about 30 vol. %, up to about 25 vol. %, up to about 20 vol. %, up to about 15 vol. %, or up to about 10 vol. %).

In some examples, the solution containing the at least one silane can be further diluted prior to combining with the other components to form the pretreatment composition. For example, the solution containing the at least one silane can be diluted in water such that the silane is present in an amount of about 5 vol. % to about 60 vol. %, for example, such that the silane is present in an amount of about 5 vol. % to about 45 vol. %. In some cases, the solution containing the silane is diluted in water such that the silane is present in an amount of about 10 vol. %.

In still further examples, a solution containing a silane and $Ce(NO_3)_3 \cdot 6H_2O$ can be diluted in water such that the silane is present in an amount of about 8 vol. % to about 12 vol. % and $Ce(NO_3)_3 \cdot 6H_2O$ is present in an amount of about 450 ppm to about 550 ppm. For example, the solution containing the silane and $Ce(NO_3)_3 \cdot 6H_2O$ can be diluted in water such that the silane is present in an amount of about 10% and the $Ce(NO_3)_3 \cdot 6H_2O$ is present in an amount of about 500 ppm.

Table 1 lists exemplary pretreatment compositions. The components of the compositions are dispersed or dissolved in water.

TABLE 1

| Matrix | | Inhibitors | | | | | | |
|---|---|---|---|---|---|---|---|---|
| | | Rare Earth Metal Salt | | | | Clay | Organic | |
| Silane (vol. %) | Ti/Zr (mg/m$^2$) | Ce(NO$_3$)$_3$·6H$_2$O (ppm) | La(NO$_3$)$_3$·6H$_2$O (ppm) | Yb(NO$_3$)$_3$·6H$_2$O (ppm) | Y(NO$_3$)$_3$·6H$_2$O (ppm) | MMT (ppm) | MBT (ppm) | BTA (ppm) |
| 5-50 | 0-12 | 0-7500 | 0-7500 | 0-7500 | 0-7500 | 0-2500 | 0-500 | 0-500 |
| 10-40 | 0-10 | 50-5000 | 50-5000 | 50-5000 | 50-5000 | 50-1000 | 0-125 | 0-300 |
| 10 | 0 | 500 | 0 | 0 | 0 | 0 | 0 | 0 |

Pretreatment Composition-Treated Aluminum Alloys

Disclosed herein are metals and alloys, such as aluminum alloys, containing at least one surface that is treated with a pretreatment composition as described herein. The coatings described herein are suitable for providing corrosion protection to any metal or alloy (e.g., an aluminum alloy). The coatings disclosed herein, which may also be referred to as a film or layer, inhibit galvanic corrosion, which can occur when aluminum alloy parts are joined together or joined to various non-aluminum based metals and alloys. While aluminum alloys are described and exemplified, the compositions and methods described herein may also be used to treat other metals and alloys, including mild steel, galvanized steel, and magnesium alloys, to name a few. The metals and alloys have corrosion resistant coatings that include chemical corrosion inhibitors dispersed in a matrix.

Specifically, the metals and alloys have a surface coating layer that includes at least one inorganic chemical corrosion inhibitor and a matrix material formed from the silane-containing or Ti/Zr-containing solution. The inorganic inhibitor can be embedded in the coating structure and involved in the overall process occurring at the metal surface, providing additional protection. In this sense, it may act as a barrier-type corrosion inhibitor, by, for example, reacting with the silane network and creating a denser structure. The inorganic chemical corrosion inhibitor includes at least one rare earth metal or a salt thereof. The surface coating layer including the inorganic chemical corrosion inhibitor protects the aluminum alloy surface from galvanic corrosion.

At least one surface of an aluminum alloy substrate (e.g., an aluminum alloy coil) can be coated by applying a pretreatment composition as described herein to the alloy to form an initial coating layer. The pretreatment composition can be applied to at least one surface of an aluminum alloy by any suitable method. For example, the coatings described herein can be applied by roll coating, spray coating, dip coating, electrodeposition, glaze coating, or drop coating a suitable pretreatment composition. These methods are generally known in the art.

Optionally, the method includes a step of degreasing the aluminum alloy surface and/or a step of etching the aluminum alloy surface prior to the coating application. The method can further include cleaning the aluminum alloy, rinsing the aluminum alloy, and drying the aluminum alloy prior to applying the pretreatment solution.

After the applying step, the method of treating an aluminum alloy can further include curing the resulting initial coating layer to form an aluminum alloy that includes a surface coating. The surface coating is also referred to herein as a coating layer. The surface coating includes a matrix material in which the corrosion inhibitors and/or additional components are dispersed. In some examples, the surface coating includes an inorganic chemical corrosion inhibitor.

In some examples, the surface coating further includes one or more additional components, such as an inorganic barrier-type corrosion inhibitor.

Generally, the inorganic chemical corrosion inhibitor (e.g., rare earth metal or salt thereof), optionally in combination with one or more additional components as described above, is dispersed in a suitable matrix that will adhere to or chemically bond to the metal substrate to provide corrosion protection to the substrate. As non-limiting examples, the matrix can include one or more of silane-based chemistries, titanium/zirconium (Ti/Zr)-based chemistries, and polymer-based chemistries. In some non-limiting examples, the matrix is silane-based. The silane-based matrix can include, for example, (3-aminopropyl)triethoxysilane (APS), 1,2-bis(triethoxysilyl)ethane (BTSE), glycidyl-oxypropyl-trimethoxysilane (GPS), tetraethoxysilane (TEOS), vinyltriethoxysilane (VTES), bis[3-(trimethoxysilyl)propyl] amine, vinyltrimethoxysilane, methyltriethoxysilane (MTES), and/or a mixture thereof. In one example, the silane-based matrix promotes adhesion to the alloy surface.

At sufficiently high coating amounts, a silane matrix alone can provide some corrosion protection; however, to sufficiently resist corrosion, large coating densities, e.g., from about 40 mg/m$^2$ to about 80 mg/m$^2$, are necessary. Such heavy coats are not accepted by, for example, the motor vehicle industry due to incompatibility with the paint process. The heavy coating densities required for corrosion protection are much larger than those used in the compositions and methods described herein. In contrast, a pretreatment composition including Ce(NO$_3$)$_3$.6H$_2$O in a silane matrix, as described herein, provides good corrosion protection at silane matrix levels up to 80% less than those required for protection by a silane matrix alone. The silane coating densities used in the compositions and methods described herein are within the range compatible with motor vehicles industry painting processes (e.g., zinc-phosphating application, electroplating, and painting), where the coating density on the sheet to be painted can be up to about 35 mg/m$^2$.

The amount of Si in the matrix material (e.g., silane) in the coating layer generally can be from about 2 mg/m$^2$ to about 35 mg/m$^2$. For example, the amount of Si in the matrix material can be about 10 mg/m$^2$ to about 13.5 mg/m$^2$. For example, the Si present in the matrix material can be about 2 mg/m$^2$, about 3 mg/m$^2$, about 4 mg/m$^2$, about 5 mg/m$^2$, about 6 mg/m$^2$, about 7 mg/m$^2$, about 8 mg/m$^2$, about 9 mg/m$^2$, about 10 mg/m$^2$, about 11 mg/m$^2$, about 12 mg/m$^2$, about 13 mg/m$^2$, about 14 mg/m$^2$, about 15 mg/m$^2$, about 16 mg/m$^2$, about 17 mg/m$^2$, about 18 mg/m$^2$, about 19 mg/m$^2$, about 20 mg/m$^2$, about 21 mg/m$^2$, about 22 mg/m$^2$, about 23 mg/m$^2$, about 24 mg/m$^2$, about 25 mg/m$^2$, about 26 mg/m$^2$, about 27 mg/m$^2$, about 28 mg/m$^2$, about 29 mg/m$^2$, about 30 mg/m$^2$, about 31 mg/m$^2$, about 32 mg/m$^2$, about 33 mg/m$^2$, about 34 mg/m$^2$, or about 35 mg/m$^2$, or any value in between. The coating weight/amount of Si on the metal or alloy can be measured by spectroscopic methods including X-ray fluorescence (XRF), glow discharge optical emission spectroscopy (GDOES), X-ray photoelectron spectroscopy (XPS), and other techniques providing information on coating weights.

The silane-based matrix serves as a vehicle to put the chemical inorganic corrosion inhibitor in close proximity to the aluminum alloy surface. Without wishing to be bound by theory, it is believed that in some examples, if the inorganic corrosion inhibitor is in close proximity to the aluminum alloy surface and the surface is under corroding conditions, the chemical corrosion inhibitor precipitates on a specific area of the corroding surface forming a barrier layer and thus inhibiting further corrosion. As one non-limiting example, when a silane matrix comprising $Ce(NO_3)_3 \cdot 6H_2O$ is applied as a pretreatment to an aluminum alloy, in response to corrosive conditions cerium ions precipitate and deposit on the aluminum surface and inhibit corrosion. $Ce(NO_3)_3 \cdot 6H_2O$ does not inhibit the adhesion of the silane matrix to the aluminum surface. In some examples, $Ce(NO_3)_3 \cdot 6H_2O$ can be present in the coating in an amount of from about 50 ppm to about 5000 pm (e.g., from about 100 ppm to about 3000 ppm or from about 300 ppm to an amount of about 700 ppm). For example, $Ce(NO_3)_3 \cdot 6H_2O$ can be present in the coating in an amount of about 50 ppm, about 100 ppm, about 150 ppm, about 200 ppm, about 250 ppm, about 300 ppm, about 350 ppm, about 400 ppm, about 450 ppm, about 500 ppm, about 550 ppm, about 600 ppm, about 650 ppm, about 700 ppm, about 750 ppm, about 800 ppm, about 850 ppm, about 900 ppm, about 950 ppm, about 1000 ppm, about 1050 ppm, about 1100 ppm, about 1150 ppm, about 1200 ppm, about 1250 ppm, about 1300 ppm, about 1350 ppm, about 1400 ppm, about 1450 ppm, about 1500 ppm, about 1550 ppm, about 1600 ppm, about 1650 ppm, about 1700 ppm, about 1750 ppm, about 1800 ppm, about 1850 ppm, about 1900 ppm, about 1950 ppm, about 2000 ppm, about 2050 ppm, about 2100 ppm, about 2150 ppm, about 2200 ppm, about 2250 ppm, about 2300 ppm, about 2350 ppm, about 2400 ppm, about 2450 ppm, about 2500 ppm, about 2550 ppm, about 2600 ppm, about 2650 ppm, about 2700 ppm, about 2750 ppm, about 2800 ppm, about 2850 ppm, about 2900 ppm, about 2950 ppm, about 3000 ppm, about 3050 ppm, about 3100 ppm, about 3150 ppm, about 3200 ppm, about 3250 ppm, about 3300 ppm, about 3350 ppm, about 3400 ppm, about 3450 ppm, about 3500 ppm, about 3550 ppm, about 3600 ppm, about 3650 ppm, about 3700 ppm, about 3750 ppm, about 3800 ppm, about 3850 ppm, about 3900 ppm, about 3950 ppm, about 4000 ppm, about 4050 ppm, about 4100 ppm, about 4150 ppm, about 4200 ppm, about 4250 ppm, about 4300 ppm, about 4350 ppm, about 4400 ppm, about 4450 ppm, about 4500 ppm, about 4550 ppm, about 4600 ppm, about 4650 ppm, about 4700 ppm, about 4750 ppm, about 4800 ppm, about 4850 ppm, about 4900 ppm, about 4950 ppm, or about 5000 ppm. In some cases, the $Ce(NO_3)_3 \cdot 6H_2O$ is present in an amount of about 500 ppm.

The coating layer can further include an inorganic barrier-type corrosion inhibitor as described herein. In some examples, the amount of inorganic barrier-type corrosion inhibitor (IBTCI) in the coating can be at least about one part in three of the Si in the silane matrix (e.g., IBTCI:Si=1:3).

The coating layer can optionally include organic corrosion inhibitors as described above. The coating layer can further include additives such as adhesives, pigments, and surfactants.

Optionally, the coated aluminum alloys can be part of a joined structure including the coated aluminum alloy and a second metal or alloy of a different composition. For example, the coated aluminum alloy can be a 1xxx series alloy, a 2xxx series alloy, a 3xxx series alloy, a 4xxx series alloy, a 5xxx series alloy, a 6xxx series alloy, a 7xxx series alloy, or an 8xxx series alloy, prepared from a cast aluminum alloy product, that is joined to another alloy or metal.

Optionally, the aluminum alloy can be a 1xxx series aluminum alloy according to one of the following aluminum alloy designations: AA1100, AA1100A, AA1200, AA1200A, AA1300, AA1110, AA1120, AA1230, AA1230A, AA1235, AA1435, AA1145, AA1345, AA1445, AA1150, AA1350, AA1350A, AA1450, AA1370, AA1275, AA1185, AA1285, AA1385, AA1188, AA1190, AA1290, AA1193, AA1198, or AA1199.

Optionally, the aluminum alloy can be a 2xxx series aluminum alloy according to one of the following aluminum alloy designations: AA2001, A2002, AA2004, AA2005, AA2006, AA2007, AA2007A, AA2007B, AA2008, AA2009, AA2010, AA2011, AA2011A, AA2111, AA2111A, AA2111B, AA2012, AA2013, AA2014, AA2014A, AA2214, AA2015, AA2016, AA2017, AA2017A, AA2117, AA2018, AA2218, AA2618, AA2618A, AA2219, AA2319, AA2419, AA2519, AA2021, AA2022, AA2023, AA2024, AA2024A, AA2124, AA2224, AA2224A, AA2324, AA2424, AA2524, AA2624, AA2724, AA2824, AA2025, AA2026, AA2027, AA2028, AA2028A, AA2028B, AA2028C, AA2029, AA2030, AA2031, AA2032, AA2034, AA2036, AA2037, AA2038, AA2039, AA2139, AA2040, AA2041, AA2044, AA2045, AA2050, AA2055, AA2056, AA2060, AA2065, AA2070, AA2076, AA2090, AA2091, AA2094, AA2095, AA2195, AA2295, AA2196, AA2296, AA2097, AA2197, AA2297, AA2397, AA2098, AA2198, AA2099, or AA2199.

Optionally, the aluminum alloy can be a 3xxx series aluminum alloy according to one of the following aluminum alloy designations: AA3002, AA3102, AA3003, AA3103, AA3103A, AA3103B, AA3203, AA3403, AA3004, AA3004A, AA3104, AA3204, AA3304, AA3005, AA3005A, AA3105, AA3105A, AA3105B, AA3007, AA3107, AA3207, AA3207A, AA3307, AA3009, AA3010, AA3110, AA3011, AA3012, AA3012A, AA3013, AA3014, AA3015, AA3016, AA3017, AA3019, AA3020, AA3021, AA3025, AA3026, AA3030, AA3130, or AA3065.

Optionally, the aluminum alloy can be a 4xxx series aluminum alloy according to one of the following aluminum alloy designations: AA4004, AA4104, AA4006, AA4007, AA4008, AA4009, AA4010, AA4013, AA4014, AA4015, AA4015A, AA4115, AA4016, AA4017, AA4018, AA4019, AA4020, AA4021, AA4026, AA4032, AA4043, AA4043A, AA4143, AA4343, AA4643, AA4943, AA4044, AA4045, AA4145, AA4145A, AA4046, AA4047, AA4047A, or AA4147.

Optionally, the aluminum alloy can be a 5xxx series aluminum alloy according to one of the following aluminum alloy designations: AA5005, AA5005A, AA5205, AA5305, AA5505, AA5605, AA5006, AA5106, AA5010, AA5110, AA5110A, AA5210, AA5310, AA5016, AA5017, AA5018, AA5018A, AA5019, AA5019A, AA5119, AA5119A, AA5021, AA5022, AA5023, AA5024, AA5026, AA5027, AA5028, AA5040, AA5140, AA5041, AA5042, AA5043, AA5049, AA5149, AA5249, AA5349, AA5449, AA5449A, AA5050, AA5050A, AA5050C, AA5150, AA5051, AA5051A, AA5151, AA5251, AA5251A, AA5351, AA5451, AA5052, AA5252, AA5352, AA5154, AA5154A, AA5154B, AA5154C, AA5254, AA5354, AA5454, AA5554, AA5654, AA5654A, AA5754, AA5854, AA5954, AA5056, AA5356, AA5356A, AA5456, AA5456A, AA5456B, AA5556, AA5556A, AA5556B, AA5556C, AA5257, AA5457, AA5557, AA5657, AA5058, AA5059, AA5070, AA5180, AA5180A, AA5082, AA5182, AA5083, AA5183, AA5183A, AA5283, AA5283A, AA5283B, AA5383, AA5483, AA5086, AA5186, AA5087, AA5187, or AA5088.

Optionally, the aluminum alloy can be a 6xxx series aluminum alloy according to one of the following aluminum alloy designations: AA6101, AA6101A, AA6101B, AA6201, AA6201A, AA6401, AA6501, AA6002, AA6003, AA6103, AA6005, AA6005A, AA6005B, AA6005C, AA6105, AA6205, AA6305, AA6006, AA6106, AA6206, AA6306, AA6008, AA6009, AA6010, AA6110, AA6110A, AA6011, AA6111, AA6012, AA6012A, AA6013, AA6113, AA6014, AA6015, AA6016, AA6016A, AA6116, AA6018, AA6019, AA6020, AA6021, AA6022, AA6023, AA6024, AA6025, AA6026, AA6027, AA6028, AA6031, AA6032, AA6033, AA6040, AA6041, AA6042, AA6043, AA6151, AA6351, AA6351A, AA6451, AA6951, AA6053, AA6055, AA6056, AA6156, AA6060, AA6160, AA6260, AA6360, AA6460, AA6460B, AA6560, AA6660, AA6061, AA6061A, AA6261, AA6361, AA6162, AA6262, AA6262A, AA6063, AA6063A, AA6463, AA6463A, AA6763, A6963, AA6064, AA6064A, AA6065, AA6066, AA6068, AA6069, AA6070, AA6081, AA6181, AA6181A, AA6082, AA6082A, AA6182, AA6091, or AA6092.

Optionally, the aluminum alloy can be a 7xxx series aluminum alloy according to one of the following aluminum alloy designations: AA7011, AA7019, AA7020, AA7021, AA7039, AA7072, AA7075, AA7085, AA7108, AA7108A, AA7015, AA7017, AA7018, AA7019A, AA7024, AA7025, AA7028, AA7030, AA7031, AA7033, AA7035, AA7035A, AA7046, AA7046A, AA7003, AA7004, AA7005, AA7009, AA7010, AA7011, AA7012, AA7014, AA7016, AA7116, AA7122, AA7023, AA7026, AA7029, AA7129, AA7229, AA7032, AA7033, AA7034, AA7036, AA7136, AA7037, AA7040, AA7140, AA7041, AA7049, AA7049A, AA7149, AA7249, AA7349, AA7449, AA7050, AA7050A, AA7150, AA7250, AA7055, AA7155, AA7255, AA7056, AA7060, AA7064, AA7065, AA7068, AA7168, AA7175, AA7475, AA7076, AA7178, AA7278, AA7278A, AA7081, AA7181, AA7185, AA7090, AA7093, AA7095, or AA7099.

Optionally, the aluminum alloy can be an 8xxx series aluminum alloy according to one of the following aluminum alloy designations: AA8005, AA8006, AA8007, AA8008, AA8010, AA8011, AA8011A, AA8111, AA8211, AA8112, AA8014, AA8015, AA8016, AA8017, AA8018, AA8019, AA8021, AA8021A, AA8021B, AA8022, AA8023, AA8024, AA8025, AA8026, AA8030, AA8130, AA8040, AA8050, AA8150, AA8076, AA8076A, AA8176, AA8077, AA8177, AA8079, AA8090, AA8091, or AA8093.

The aluminum alloy can be in any suitable temper. In one non-limiting example, the other metal or alloy is galvanized steel.

The coated aluminum alloy can be fabricated into an aluminum alloy product, including an aluminum alloy plate, sheet, or shate. In some examples, the alloy can be fabricated into an aluminum alloy sheet including any coating described herein. In some examples, the alloy can be fabricated into a shaped article formed from any aluminum alloy sheet described herein and including any coating layer formed from a pretreatment composition as described herein. In some examples, the alloy is a shaped article formed from any aluminum alloy sheet described herein and includes any coating described herein, wherein the shaped article is joined to another article formed from a different alloy or a different metal (e.g., a second metal or a second alloy). In some non-limiting examples, the aluminum alloy and the second metal and/or alloy are bonded to form a joint of any suitable configuration, including lap, edge, butt, T-butt, hem, T-edge, and the like.

The disclosed coatings and methods improve the galvanic corrosion resistance of aluminum and aluminum alloys when put in direct contact with dissimilar metals and alloys. Alloys that would benefit from the protective coating layers disclosed herein include those used in the motor vehicle industry (e.g., in automotive joints), manufacturing applications, electronics applications, industrial applications, and others. Optionally, the alloy is a part of a joined structure such as, for example, the chassis of an automobile or other motor vehicle. The chassis can be in the body in white stage or painted.

Illustrations

Illustration 1 is a pretreatment composition comprising: at least one rare earth metal or salt thereof and a solution comprising at least one silane, wherein the at least one rare earth metal or salt thereof is present in an amount of about 50 to about 7500 ppm and the solution comprising the at least one silane is present in an amount of about 5 vol. % to about 50 vol. %.

Illustration 2 is the pretreatment composition of any preceding or subsequent illustration, wherein the at least one rare earth metal or salt thereof comprises at least one of cerium, yttrium, ytterbium, and lanthanum.

Illustration 3 is the pretreatment composition of any preceding or subsequent illustration, wherein the at least one rare earth metal or salt thereof comprises cerium (III) nitrate.

Illustration 4 is the pretreatment composition of any preceding or subsequent illustration, wherein the cerium (III) nitrate is present in an amount of about 500 ppm and the solution comprising the at least one silane is present in an amount of about 10 vol. %.

Illustration 5 is the pretreatment composition of any preceding or subsequent illustration, further comprising clay particles.

Illustration 6 is an aluminum alloy comprising a surface coating comprising at least one rare earth metal or salt thereof dispersed in a matrix comprising at least one silane.

Illustration 7 is the aluminum alloy of any preceding or subsequent illustration, wherein the at least one rare earth metal or salt thereof is present in an amount of about 50 ppm to about 3000 ppm.

Illustration 8 is the aluminum alloy of any preceding or subsequent illustration, wherein the at least one rare earth metal or salt thereof is present in an amount from greater than about 100 ppm to less than about 3000 ppm.

Illustration 9 is the aluminum alloy of any preceding or subsequent illustration, wherein the at least one rare earth metal or salt thereof comprises cerium, yttrium, ytterbium, lanthanum, or a combination thereof.

Illustration 10 is the aluminum alloy of any preceding or subsequent illustration, wherein the at least one rare earth metal or salt thereof comprises cerium (III) nitrate.

Illustration 11 is the aluminum alloy of any preceding or subsequent illustration, wherein the at least one silane comprises at least one of (3-aminopropyl)triethoxysilane, 1,2-bis(triethoxysilyl)ethane, glycidyl-oxypropyl-trimethoxysilane, tetraethoxysilane, vinyltriethoxysilane, bis[3-(trimethoxysilyl)propyl]amine, vinyltrimethoxysilane, and methyltriethoxysilane.

Illustration 12 is the aluminum alloy of any preceding or subsequent illustration, wherein the surface coating further comprises an inorganic barrier-type corrosion inhibitor.

Illustration 13 is the aluminum alloy of any preceding or subsequent illustration, wherein the inorganic barrier-type corrosion inhibitor comprises clay particles.

Illustration 14 is the aluminum alloy of any preceding or subsequent illustration, wherein the clay particles comprise montmorillonite.

Illustration 15 is the aluminum alloy of any preceding or subsequent illustration, wherein the aluminum alloy comprises a 1xxx series alloy, a 2xxx series alloy, a 3xxx series alloy, a 4xxx series alloy, a 5xxx series alloy, a 6xxx series alloy, a 7xxx series alloy, or an 8xxx series alloy.

Illustration 16 is the aluminum alloy of any preceding or subsequent illustration, wherein silicon is present on a surface of the aluminum alloy in an amount of from about 2 $mg/m^2$ to about 35 $mg/m^2$.

Illustration 17 is a joined structure, comprising the aluminum alloy of any preceding or subsequent illustration and another metal or alloy.

Illustration 18 is a method of treating an aluminum alloy, comprising applying the pretreatment composition of any preceding or subsequent illustration to a surface of the aluminum alloy to form an initial coating layer.

Illustration 19 is the method of any preceding or subsequent illustration, wherein the applying the pretreatment composition comprises roll coating or spray coating the aluminum alloy.

Illustration 20 is the method of any preceding or subsequent illustration, further comprising curing the initial coating layer to provide a coated alloy.

Illustration 21 is the method of any preceding illustration, wherein the aluminum alloy is an aluminum alloy sheet.

The following examples will serve to further illustrate the present invention without, however, constituting any limitation thereof. On the contrary, it is to be clearly understood that resort may be had to various embodiments, modifications, and equivalents thereof which, after reading the description herein, may suggest themselves to those skilled in the art without departing from the spirit of the invention.

EXAMPLES

Example 1

Formulation of the Pretreatment Solution

To prepare the silane-based pretreatment compositions, PERMATREAT 1003 A, commercially available from Chemetall (Frankfurt, Germany), was used without purification.

Silane based pretreatment compositions were formulated by adding $Ce(NO_3)_3 \cdot 6H_2O$ to the PERMATREAT 1003 A solution. MMT was included in some of the silane-based pretreatment solutions. Organic inhibitors MBT and BTA were included in some of the silane-based pretreatment solutions.

Several pretreatment compositions were prepared by the same general method. For the inorganic and organic inhibitor-containing pretreatment solutions, a magnetic stir bar was added to a 250 mL graduated flask. The desired amount of inhibitor-containing compound (e.g., $Ce(NO_3)_3 \cdot 6H_2O$ and/or organic inhibitor) was added slowly to a 250 mL flask by weight if solid, by volume if liquid. Purified water (100 mL) was added and the mixture was stirred to dissolve the solid inhibitor(s) and/or dilute the liquid inhibitor(s). The desired amount of matrix material (e.g., silane containing solution) was added to the solution. Purified water was further added to create a total volume of 250 mL. The solution was allowed to stir until stable. Solutions prone to precipitation were stirred until transferred to the roll coater.

For the pretreatment solutions containing clay particles, the following procedure was used. The clay particle powder was weighed to a quantity five times greater than the desired amount. The powder was then ground for 30 minutes by hand in a mortar such that the resulting powder was as fine as possible. The powder was added slowly to 100 mL of deionized water with continuous magnetic stirring. A 35% nitric acid solution (2-10 mL) was added to the aqueously-dispersed clay particles to help dissolution of the powder to avoid agglomeration. The solution was stirred rapidly for 30 minutes and was then exposed to strong ultrasonic agitation for 15 minutes. The solution was then magnetically stirred for 15 minutes. The solution was allowed to stand for 5 minutes. Any precipitated material was removed from the solution. The solution was transferred to a clean beaker and the solution was magnetically stirred. The MMT concentration was measured by transferring an aliquot to a 10 mL beaker and evaporating the solvent. The MMT concentration was adjusted as desired. Additional deionized water was added to produce a total mixture volume of 250 mL. The solution was continuously stirred prior to application.

Table 2 contains the pretreatment compositions prepared by the method described above. Formulations 11 and 12, containing MBT and BTA, respectively, as the inhibitors, were prepared for comparative purposes. Formulations 13 and 14, using Ti/Zr as a matrix, were prepared for comparative purposes. As described in more detail below, Formulation 3 provided the most desirable corrosion resistance.

TABLE 2

| | Matrix | | Inhibitors | | | | | | |
| | | | Rare Earth | | | | Clay | Organic | |
| Formulation | Silane (vol. %) | Ti/Zr ($mg/m^2$) | $Ce(NO_3)_3 \cdot 6H_2O$ (ppm) | $La(NO_3)_3 \cdot 6H_2O$ (ppm) | $Yb(NO_3)_3 \cdot 6H_2O$ (ppm) | $Y(NO_3)_3 \cdot 6H_2O$ (ppm) | MMT (ppm) | MBT (ppm) | BTA (ppm) |
|---|---|---|---|---|---|---|---|---|---|
| 1 | 10 | | | | | | | | |
| 2 | 10 | | 100 | | | | | | |
| 3 | 10 | | 500 | | | | | | |
| 4 | 10 | | | 500 | | | | | |
| 5 | 10 | | | | 500 | | | | |
| 6 | 10 | | | | | 500 | | | |
| 7 | 10 | | 3000 | | | | | | |

TABLE 2-continued

| | Matrix | | Inhibitors | | | | | | |
| | | | Rare Earth | | | | Clay | Organic | |
| Formulation | Silane (vol. %) | Ti/Zr (mg/m²) | Ce(NO$_3$)$_3$·6H$_2$O (ppm) | La(NO$_3$)$_3$·6H$_2$O (ppm) | Yb(NO$_3$)$_3$·6H$_2$O (ppm) | Y(NO$_3$)$_3$·6H$_2$O (ppm) | MMT (ppm) | MBT (ppm) | BTA (ppm) |
|---|---|---|---|---|---|---|---|---|---|
| 8 | 10 | | 50 | | | | 1000 | | |
| 9 | 10 | | 100 | | | | 1000 | | |
| 10 | 10 | | 500 | | | | 1000 | | |
| 11 | 10 | | | | | | | 100 | |
| 12 | 10 | | | | | | | | 250 |
| 13 | | 8 | | | | | | | |
| 14 | | 8 | 100 | | | | 500 | | |
| 15 | 40 | | | | | | | | |
| 16 | 40 | | 500 | | | | | | |
| 17 | 40 | | 5000 | | | | | | |

Example 2

Application of the Pretreatment Solution to the Aluminum Alloy Substrate

The pretreatment solutions listed in Table 2 were roll-coated onto an aluminum alloy sheet of 1 mm gauge. FIG. 1 is a schematic of the roll-coating process including a container 110 for the pretreatment solution, a striated roll 120 for applying the solution 130, and an impression roller 140 for advancing the substrate 150 and applying pressure. The striated roll 120 picked up the solution 130 and deposited the pretreatment on the substrate 150, coating the bottom side of the sheet 150. The volume density was kept constant at about 4 mL/m² across the surface of the sheet. The coatings were then cured in an oven. The roll coating provided a final average coating density after curing of about 12 mg/m² silicon when using a solution containing 10 vol. % PERMATREAT 1003 A. The coating density can be controlled by changing the concentration of the solution, the pressure of the impression roll of the roll-coater or the coating speed, to name a few parameters.

Example 3

Galvanic Corrosion Testing

Figure 2:
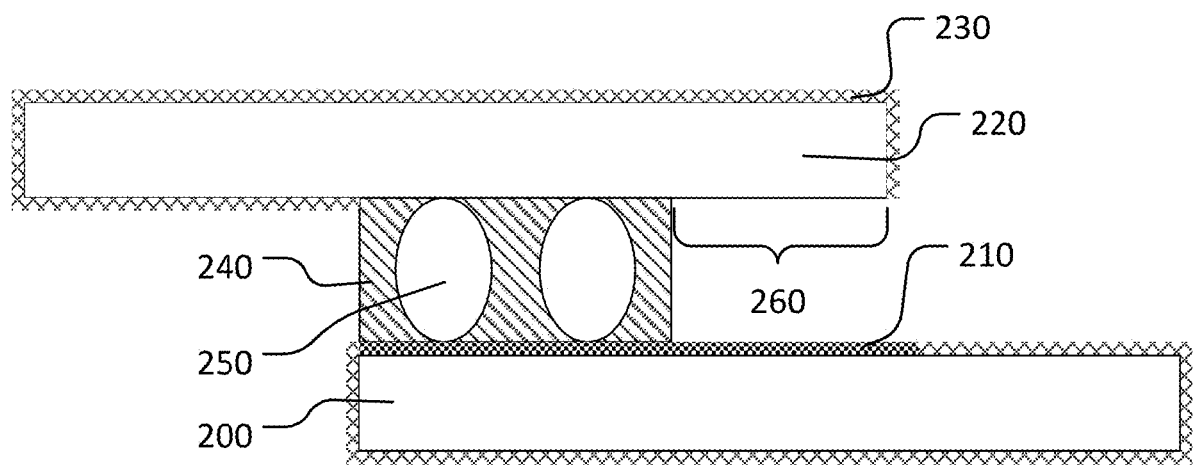
FIG. 2 is a schematic illustration of the testing geometry used to assess galvanic corrosion.

Galvanic protection was tested using a special geometry developed to have a defined area in which the aluminum alloy and galvanized steel are in electrical contact by metal wires embedded in an adhesive. FIG. 2 is a schematic illustration of the testing geometry. The aluminum alloy sheet 200 was completely coated with the pretreatment solution. Both aluminum alloy sheet 200 and steel sheet 220 were completely zinc-phosphated and coated with an electrocoating 230. The aluminum alloy sheet 200 was bonded to the steel sheet 220 with the adhesive 240. Metal wires 250 were embedded in the adhesive 240 to create the electrical contact. A controlled overlap 260 of 1 cm by 7 cm was employed in the test geometry. This geometry provided reproducible spacing for reliable test results. The sheets used in the examples included aluminum alloy 6014 and galvanized steel HX340LAD+Z10. The aluminum alloy composition is listed in Table 3, with impurities totaling up to 0.15 wt. % and the remainder Al. All values are provided in wt. %.

TABLE 3

| Alloy | Si | Fe | Cu | Mn | Mg | Cr | Zn | Ti | V |
|---|---|---|---|---|---|---|---|---|---|
| AA6014 | 0.3-0.6 | 0.35 | 0.25 | 0.05-0.2 | 0.4-0.8 | 0.2 | 0.1 | 0.1 | 0.05-0.2 |

The steel composition is listed in Table 4. All values are provided in wt. %.

TABLE 4

| Alloy | C | Si | Mn | P | S | Ti | Nb | Al |
|---|---|---|---|---|---|---|---|---|
| HX340LAD | 0-0.11 | 0-0.5 | 0-1.0 | 0-0.025 | 0-0.025 | 0-0.15 | 0-0.09 | 0.015-No Max |

The copper-accelerated acetic acid-salt spray (CASS) test (ASTM B368) was employed to provide a corrosive environment in which the samples undergo galvanic corrosion. The CASS test duration was twenty (20) days. The substrates were then separated for corrosion evaluation.

Figure 3:
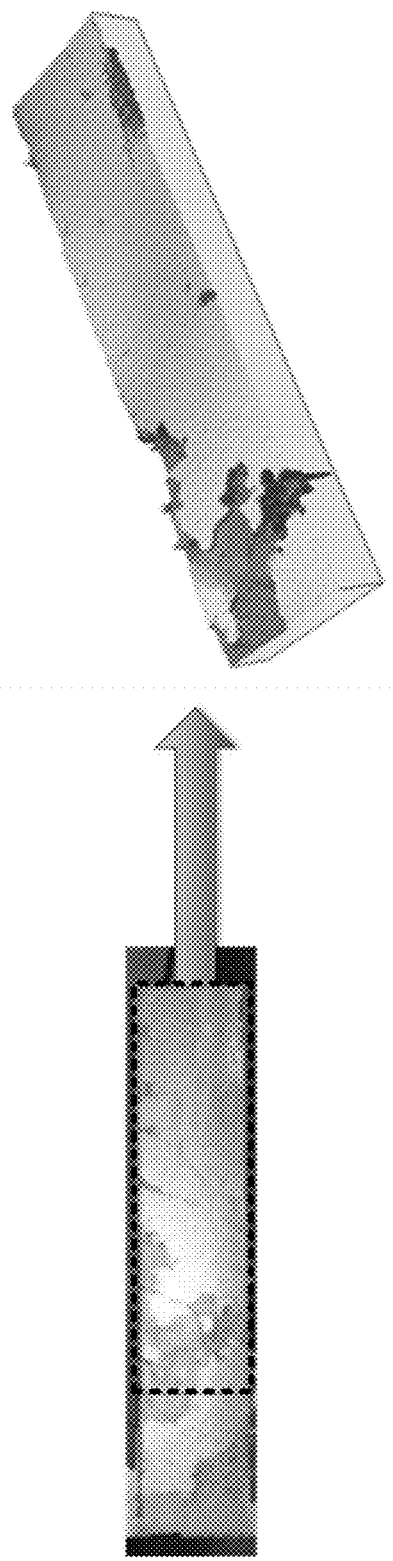
FIG. 3 is a white light interferometer 3D-image.
Figure 4A:
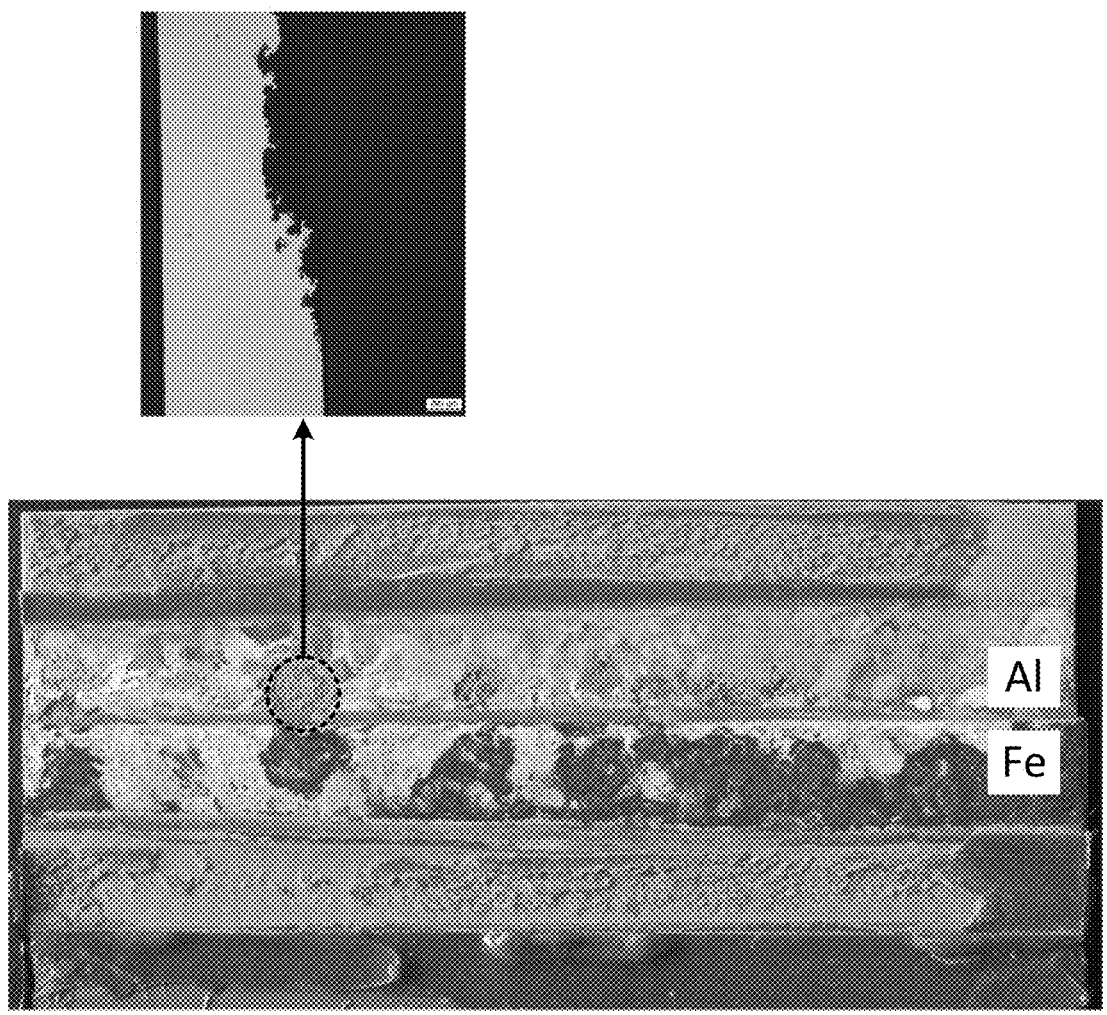
FIG. 4A is a digital image of a non-pretreated aluminum alloy after testing with electrical contact and separation from the galvanized steel.
Figure 4B:
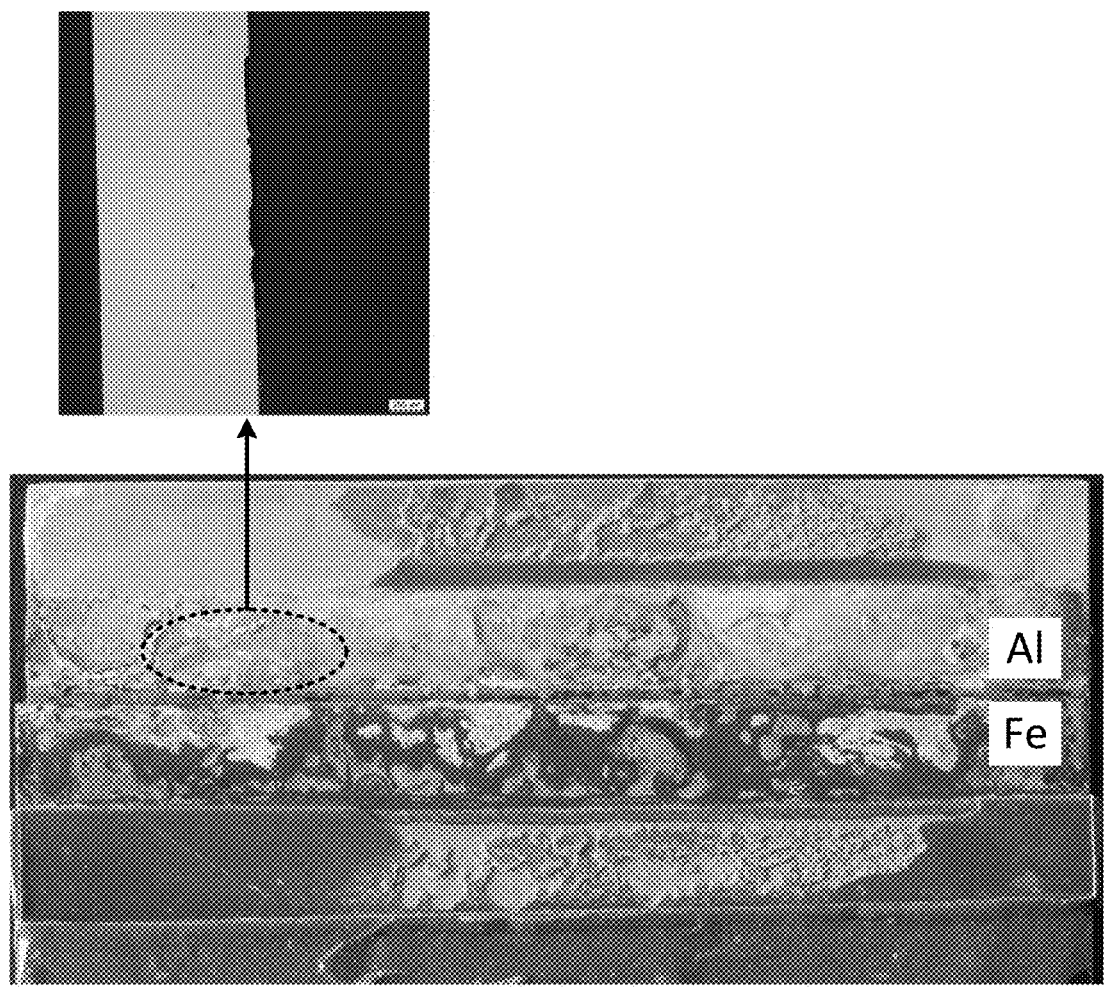
FIG. 4B is a digital image of a non-pretreated aluminum alloy after testing without electrical contact and separation from the galvanized steel.

Assessment of the corroded aluminum alloy was made by three-dimensional (3-D) imaging using a Polytec Inc. white-light-interferometer. The extent of corrosion was determined by loss of aluminum alloy volume (mm³). A representative image is presented in FIG. 3, where different shades of gray indicate the depth of corrosion. FIG. 4A and FIG. 4B show the results of the CASS test of alloy samples that were not pretreated. FIG. 4A shows the extent of corrosion on the aluminum alloy when aluminum wire was placed between the aluminum alloy and galvanized steel to create an electrical contact. The outset optical image shows a cross-section exhibiting the extent of the corrosion. Strong corrosion with deep pits was observed. FIG. 4B presents the extent of the corrosion on the aluminum alloy when there was no electrical contact with the galvanized steel. The outset optical image shows a cross-section exhibiting the extent of the corrosion. The corrosion appeared on fewer areas and was less advanced. These results demonstrate that galvanic corrosion is induced when using this test geometry. This test simulates galvanic corrosion occurring at dissimilar metal joints in a motor vehicle body. The joints can be adhesively bonded near riveted and/or welded areas.

Example 4

The surfaces of aluminum alloy sheets were pretreated according to the methods described in Example 2. Formulations 1, 3, 15, and 16 were applied to an AA6014 aluminum alloy with a roll coater. Aluminum alloy and steel sheets were joined as described in Example 3. Aluminum alloy sheets and steel sheets were zinc-phosphated and electrocoated, except at the bonded and controlled overlap (FIG. 2).

Figure 5:
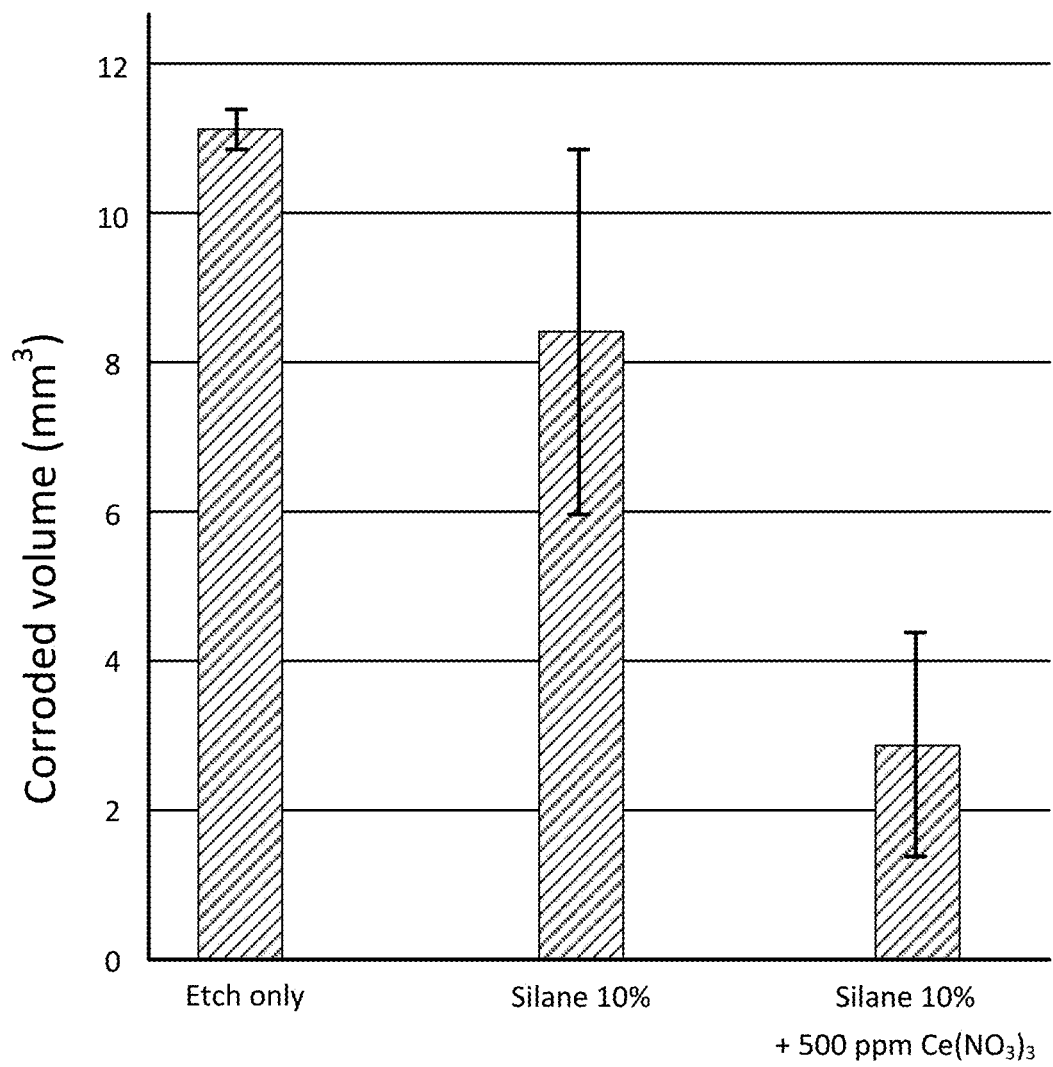
FIG. 5 is a graph of an effect of cerium ions in a silane matrix.

FIG. 5 is a graph showing the effect of cerium ions on the corrosion resistance of silane. Aluminum alloys coated with Formulations 1 and 3 were compared to the non-pretreated sample (denoted "Etch only") to demonstrate the ability of the formulations to inhibit corrosion. The graph depicts corrosion resistance as the volume of metal removed during the CASS test. Less volume removed indicates higher resistance to corrosion. For the sample without any pretreatment coating, about 11 $mm^3$ of metal was removed from the sample. For Formulation 1, the silane matrix without additives, the volume of metal removed was reduced to about 8.5 $mm^3$. Formulation 3, the coating containing both silane and cerium particles, provided enhanced corrosion resistance. With Formulation 3, only about 3 $mm^3$ of metal was removed.

Figure 6:
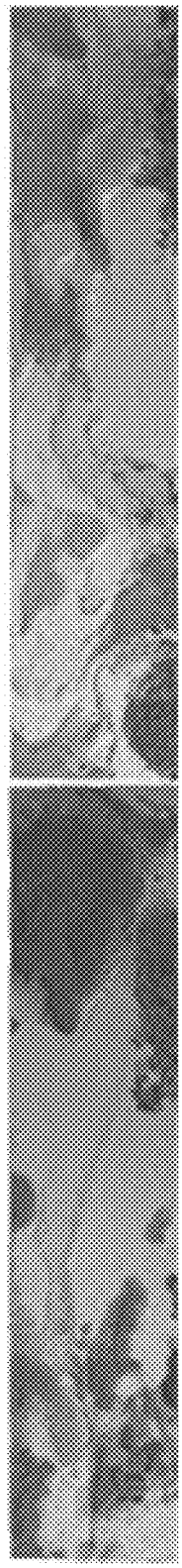
FIG. 6A and FIG. 6B are white light interferometer images of alloys subjected to corroding conditions.
Figure 7:
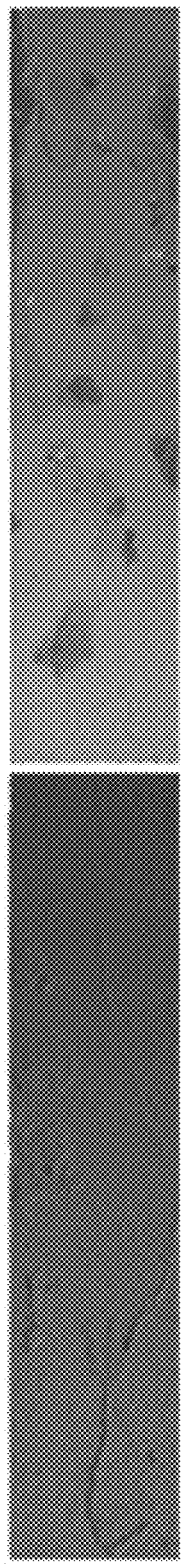
FIG. 7A and FIG. 7B are white light interferometer images of alloys treated by methods described herein and subjected to corrosion conditions.

FIG. 6A and FIG. 6B are 3-D interferometer images of samples pretreated with Formulation 1. FIG. 7A and FIG. 7B are 3-D interferometer images of samples pretreated with Formulation 3. FIGS. 6A, 6B, 7A, and 7B show the positive correlation between the interferometer images of the corroded aluminum alloy and the quantitative corrosion volume.

Figure 8:
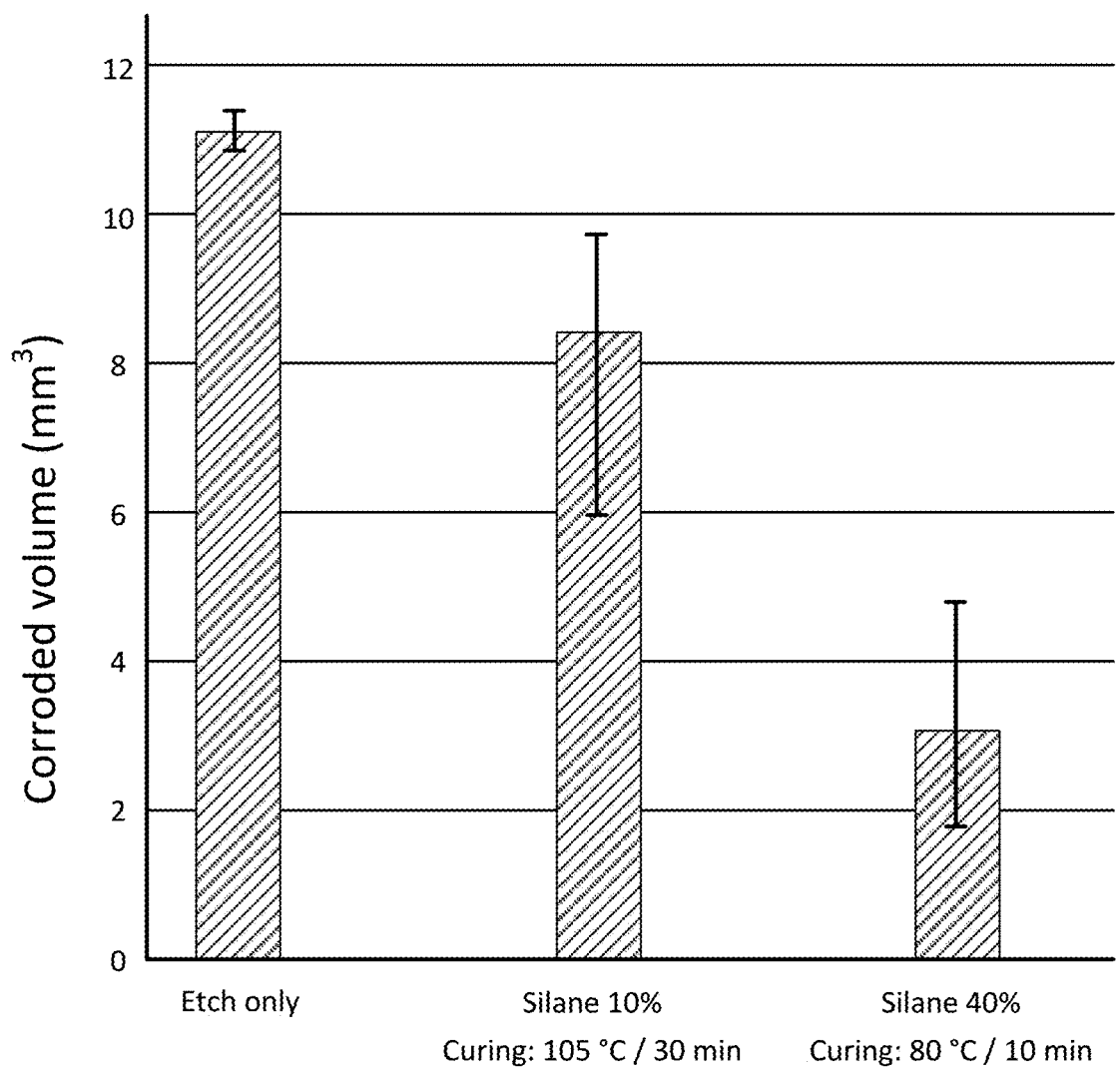
FIG. 8 is a graph showing effects of silane matrix concentrations.

FIG. 8 is a graph showing the effect of changing the silane concentration without added inhibitors. The aluminum alloy coated with a higher concentration silane solution, Formulation 15, was compared to the non-pretreated sample and a sample pretreated with Formulation 1 to demonstrate the ability of the neat silane matrix to inhibit corrosion. Formulation 15 enhanced the resistance to corrosion, as only about 3 $mm^3$ of metal was removed.

Figure 9:
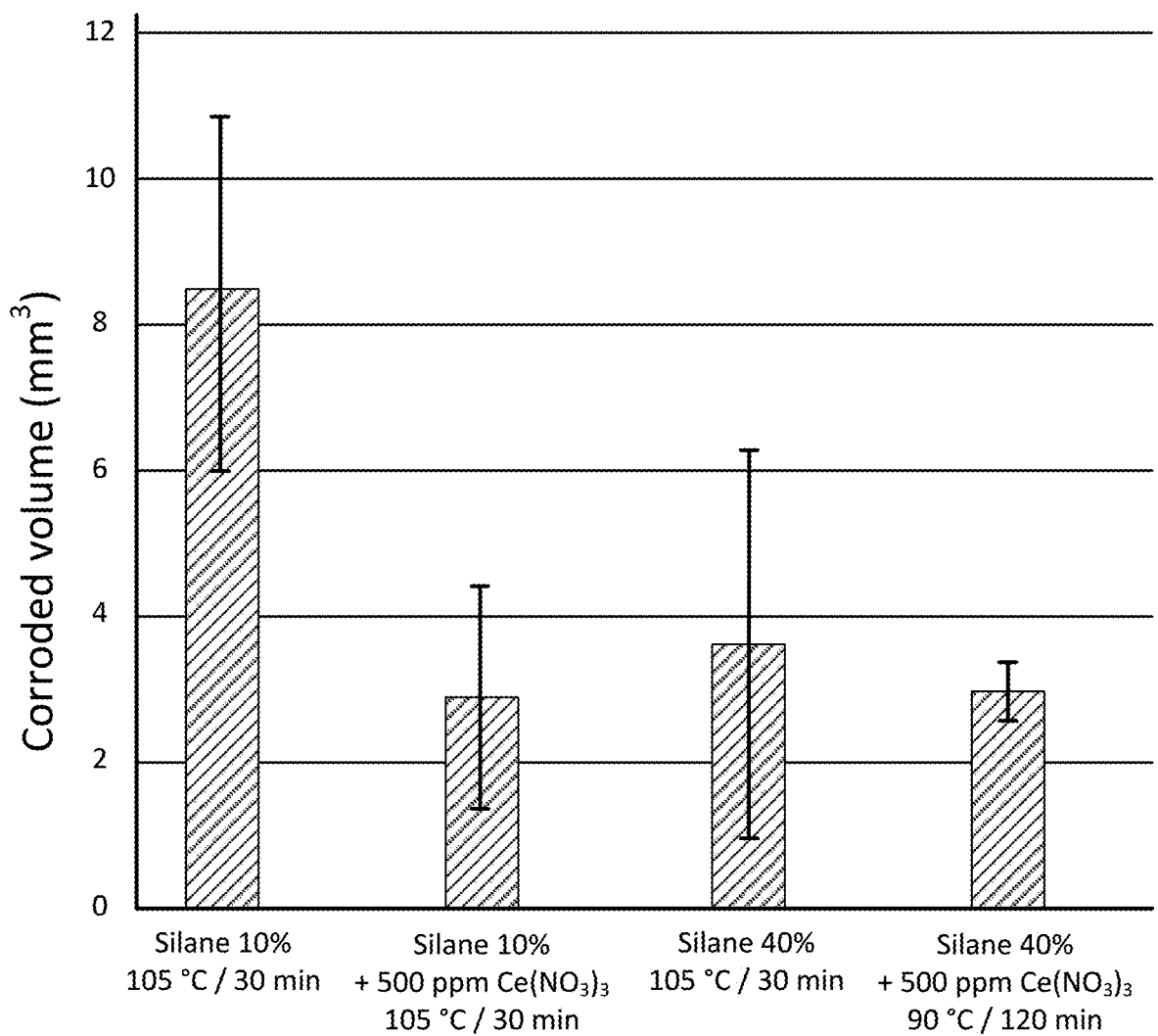
FIG. 9 is a graph showing effects of different silane matrix concentrations with and without $Ce(NO_3)_3 \cdot 6H_2O$.

FIG. 9 is a graph showing the enhancement to corrosion resistance by adding $Ce(NO_3)_3$ (in the form of $Ce(NO_3)_3 \cdot 6H_2O$) to matrices having different concentrations of silane, wherein 500 ppm dispersions of $Ce(NO_3)_3$ were added to the 10 vol. % silane solution (Formulation 3) and to the 40 vol. % silane solution (Formulation 16). The addition of the $Ce(NO_3)_3$ aided in the corrosion resistance in the silane matrix at a 10 vol. % concentration. At 40 vol. % silane, no major change in corrosion resistance was observed. The most desirable corrosion resistance, exemplified in FIGS. 5, 8 and 9, was achieved when the silane is diluted in water in an amount of about 10 vol. % and the $Ce(NO_3)_3$ is present at a concentration of about 500 ppm.

Example 5

Aluminum alloy sheets were treated according to the method described in Example 2. Formulations 1, 3, 8, 9, and 10 were applied to the aluminum alloy substrates with a roll coater.

Figure 10:
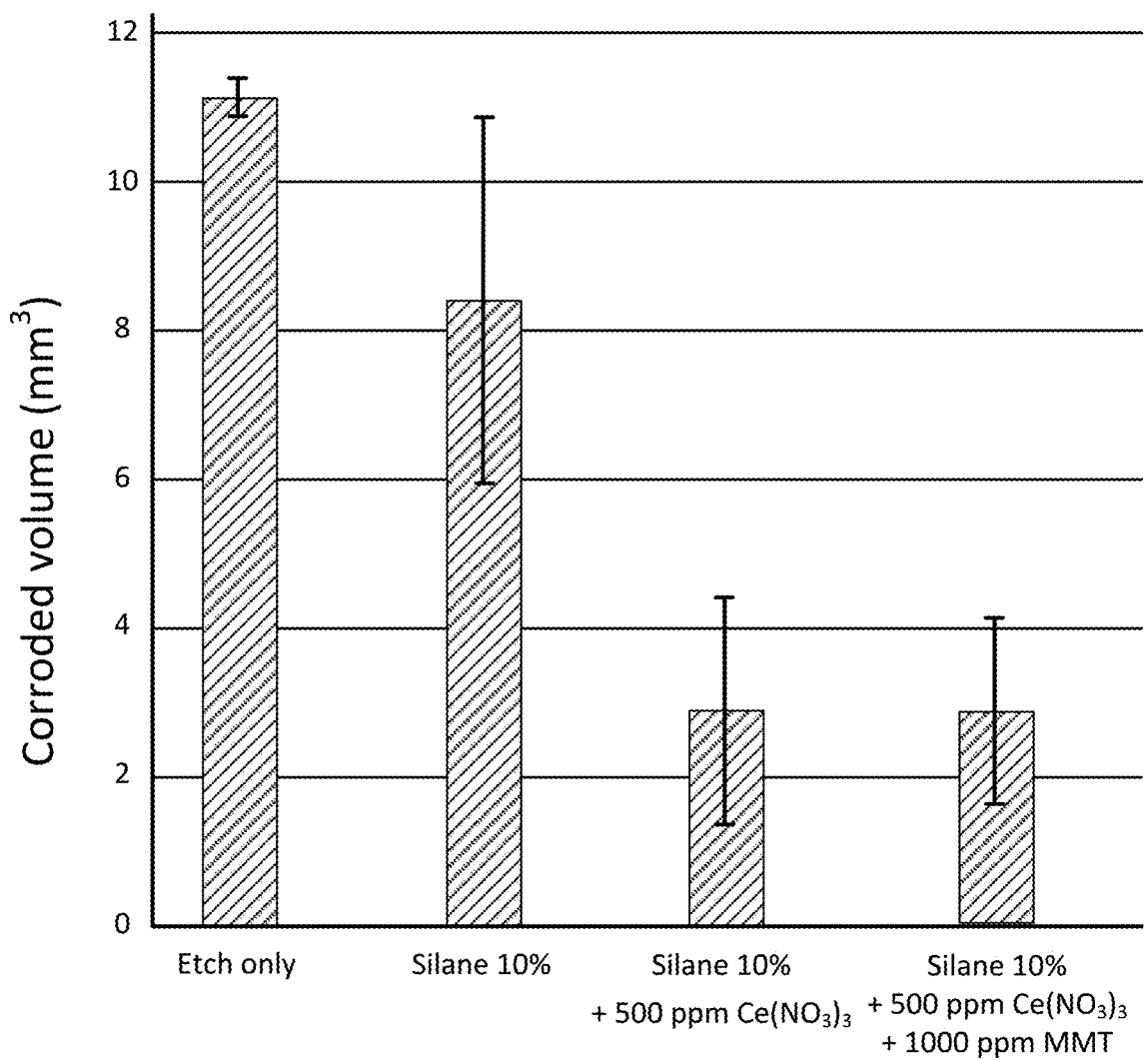
FIG. 10 is a graph showing effects of $Ce(NO_3)_3 \cdot 6H_2O$ and $Ce(NO_3)_3 \cdot 6H_2O$/MMT in a silane matrix.

FIG. 10 is a graph comparing a pretreatment composition including $Ce(NO_3)_3$ in a silane matrix to a pretreatment composition including both $Ce(NO_3)_3$ and MMT in a silane matrix. The pretreatments provided similar galvanic corrosion protection with or without the clay particles. The MMT provides little to no additional corrosion protection over that provided by $Ce(NO_3)_3$ as can be seen by comparing the data presented for a 10 vol. % silane matrix including 500 ppm $Ce(NO_3)_3$ and MMT with the data for the same pretreatment without the MMT. Formulation 3 offers the most desirable corrosion resistance.

Figure 11:
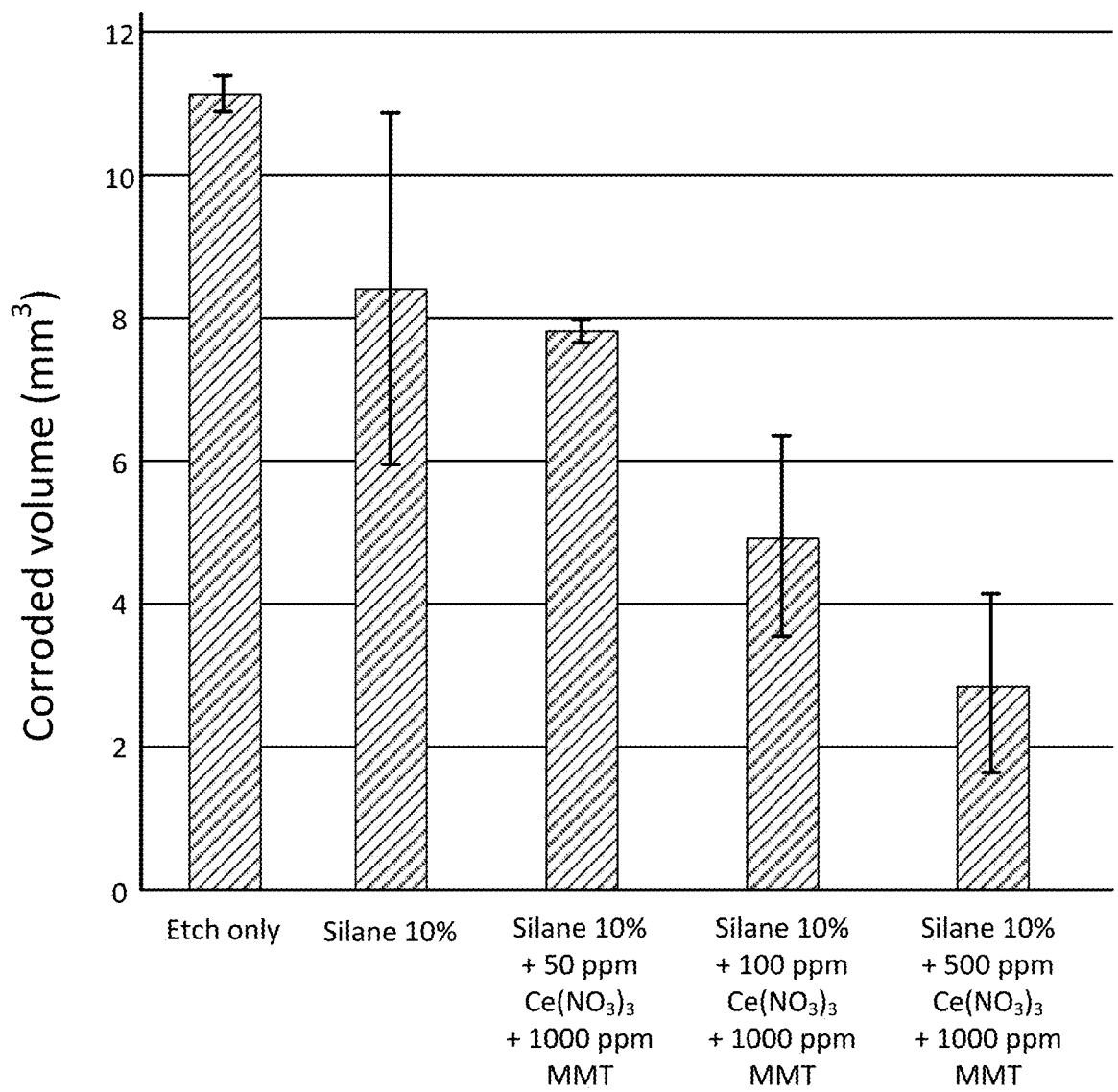
FIG. 11 is a graph showing effects of $Ce(NO_3)_3 \cdot 6H_2O$ at different concentrations with clay particles in the silane matrix.

FIG. 11 is a graph showing the effect on corrosion resistance of pretreatments including both $Ce(NO_3)_3$ and MMT particles. The formulations employed various amounts of $Ce(NO_3)_3$. Aluminum alloy substrates coated with Formulations 8, 9, and 10 were compared to the non-pretreated sample. The best corrosion resistance was obtained with the $Ce(NO_3)_3$ at a 500 ppm concentration (Formulation 10). $Ce(NO_3)_3$ at 100 ppm (Formulation 9) also improved the corrosion resistance, but not as well as formulation 10. The coating with $Ce(NO_3)_3$ at 50 ppm in the silane (Formulation 8) did not give additional corrosion protection over the silane alone. Formulation 10 is Formulation 3 with added clay particles, demonstrating the silane diluted in water in an amount of 10 vol. % with the $Ce(NO_3)_3$ present at 500 ppm provided desirable corrosion resistance.

Example 6

Aluminum alloy sheets were treated according to the method described in Example 2. Formulations 1, 3, 10, 11, 12, 13, and 14 were applied to the sheets with a roll coater and cured.

Figure 12:
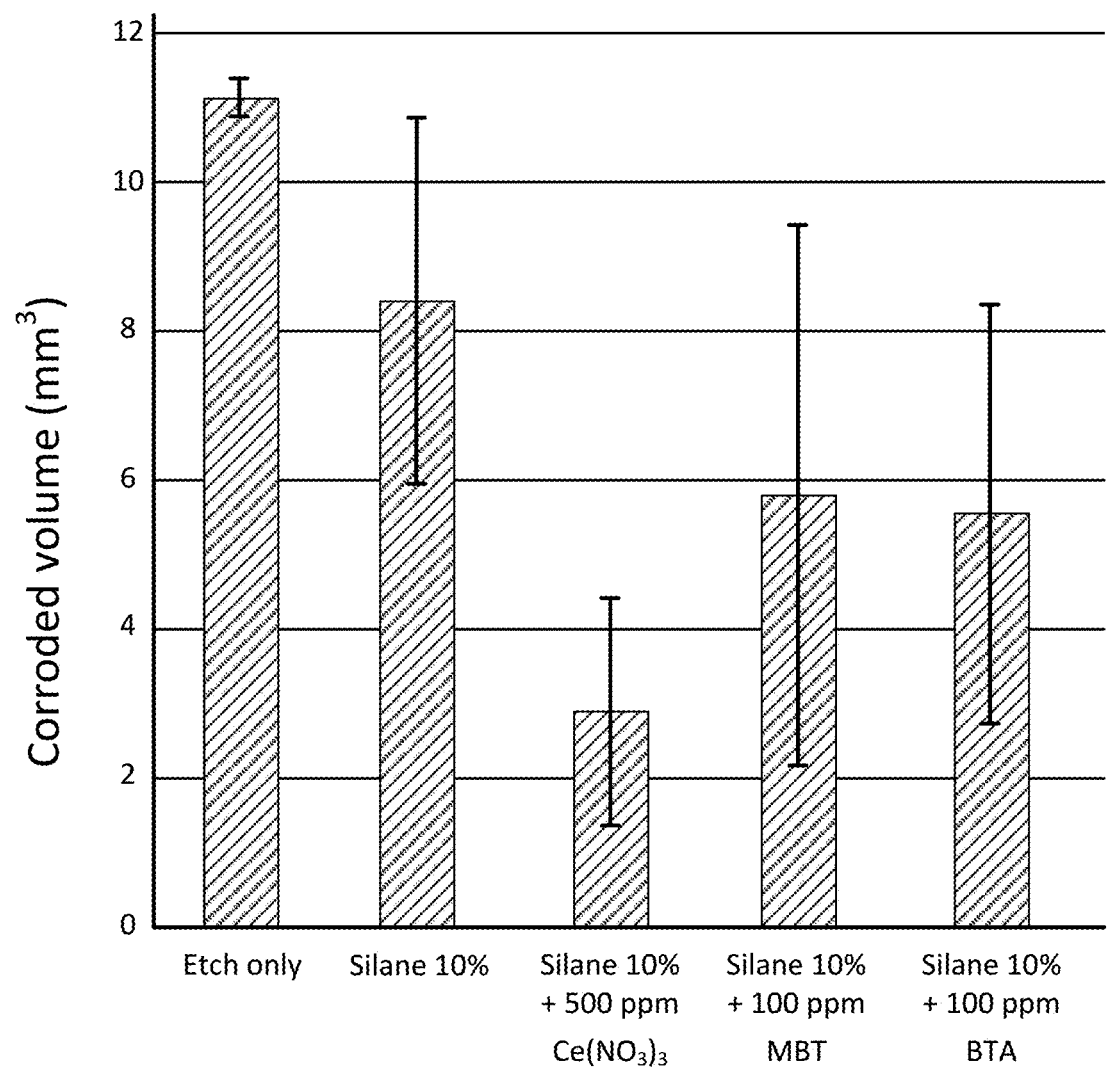
FIG. 12 is a graph showing effects of different organic inhibitors and $Ce(NO_3)_3 \cdot 6H_2O$ in the silane matrix.

FIG. 12 is a graph showing the effect on corrosion resistance when MBT and BTA were added to a neat silane matrix. Aluminum alloy substrates coated with Formulation 11 (MBT) and Formulation 12 (BTA) were compared to the non-pretreated sample and to a sample pretreated with Formulation 1 to demonstrate the ability of the organic additives to inhibit corrosion. The organic inhibitors provided improved corrosion resistance but not to the extent of the $Ce(NO_3)_3$. Each of the formulations with the organic inhibitors allowed about 6 $mm^3$ of metal to be removed. The formulation containing only cerium nitrate allowed about 3 $mm^3$ to be removed.

Figure 13:
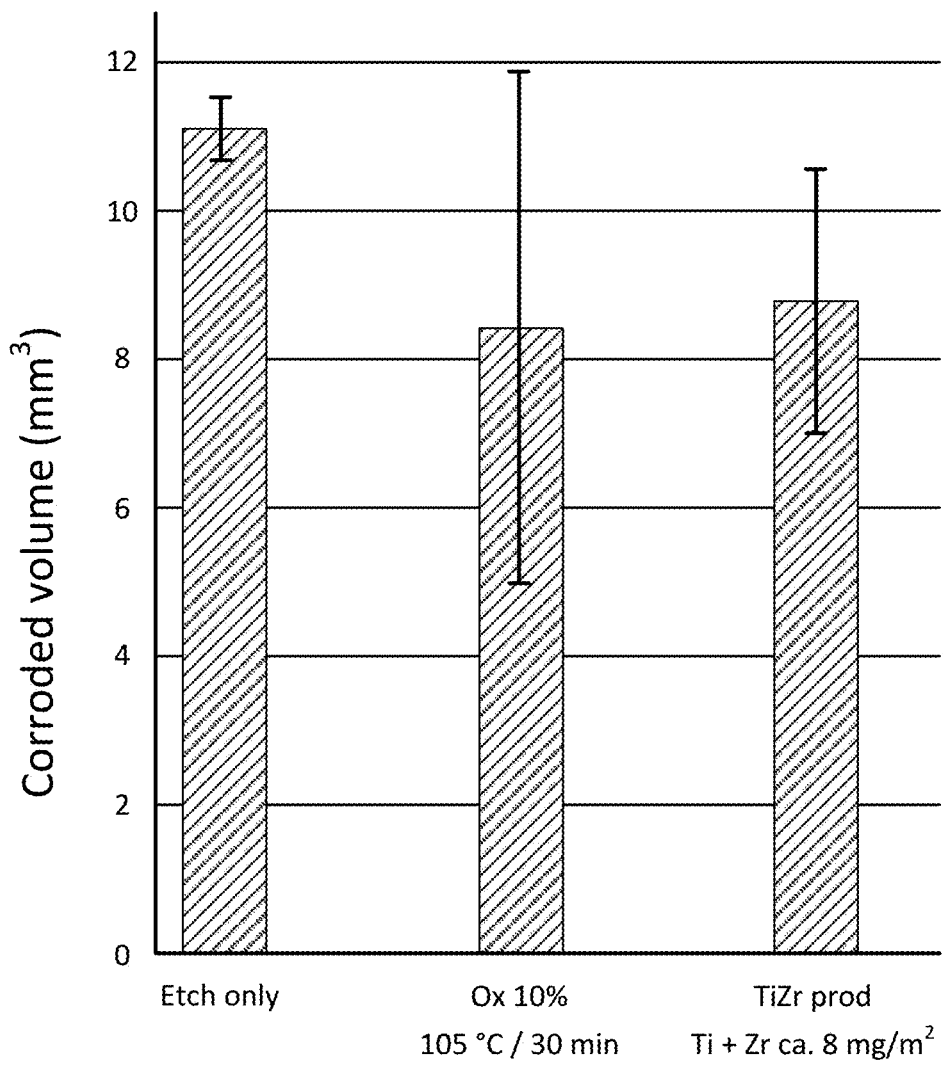
FIG. 13 is a graph showing effects of silane and Ti/Zr matrices.

FIG. 13 is a graph showing corrosion resistance of the Ti/Zr matrix. An aluminum alloy substrate coated with Formulation 13 was compared to a non-pretreated sample and to a sample pretreated with Formulation 1 to demonstrate the ability of the Ti/Zr layer to inhibit corrosion. The Ti/Zr matrix provided corrosion resistance similar to the silane matrix.

Figure 14:
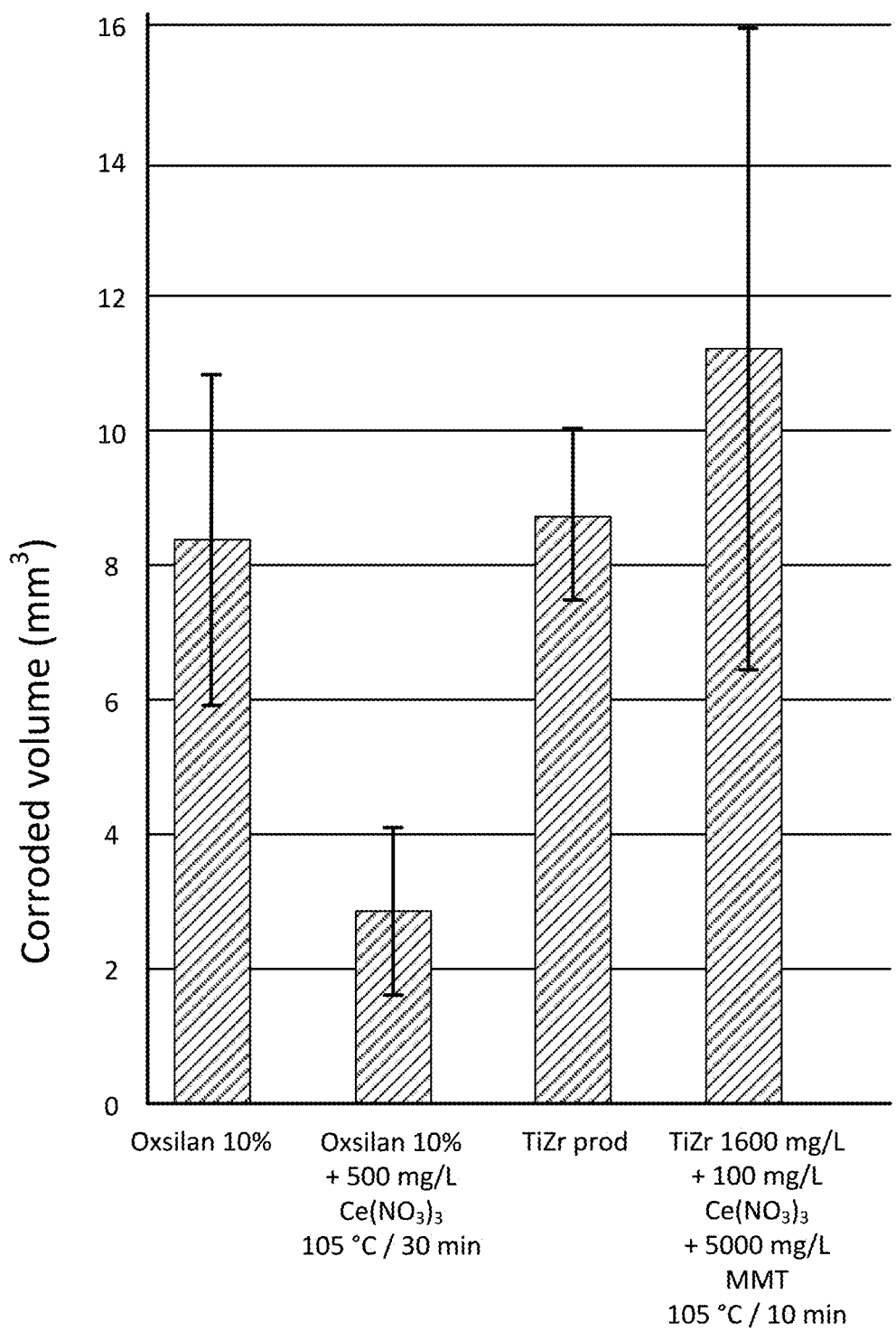
FIG. 14 is a graph showing effects of cerium and clay particles in silane and Ti/Zr matrices.

FIG. 14 is a graph comparing the inhibition of the neat silane matrix, the neat Ti/Zr matrix, and both matrices including both $Ce(NO_3)_3$ and MMT. The neat silane and neat Ti/Zr pretreatments provided similar corrosion resistance. The Ti/Zr pretreatment containing $Ce(NO_3)_3$ and MMT did not provide any corrosion resistance, allowing about 11 $mm^3$ of metal to be removed. The silane pretreatment containing $Ce(NO_3)_3$ and MMT provides increased corrosion resistance, allowing only about 3 $mm^3$ of metal to be removed.

Example 7

Aluminum alloy sheets were treated according to the methods described in Example 2. Formulations 1 and 3 were applied onto the sheets with a roll coater and cured.

Figure 15:
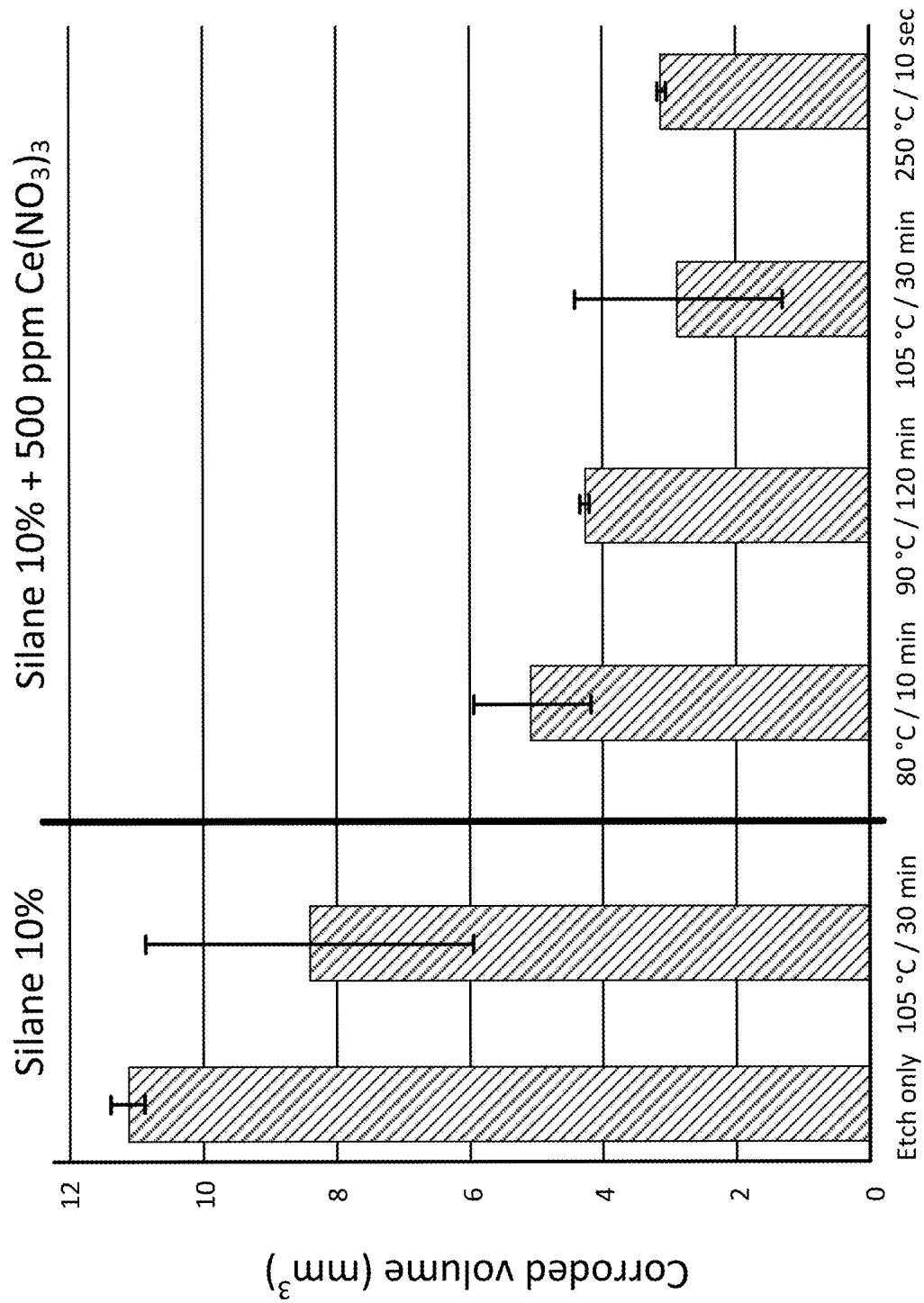
FIG. 15 is a graph showing effects of curing on the silane and cerium system.

FIG. 15 is a graph that presents the effect of various curing recipes on the corrosion resistance of the silane matrix containing 500 ppm of $Ce(NO_3)_3$. Cure parameters included 105° C. for 30 minutes, 80° C. for 10 minutes, 90° C. for 2 hours, and 250° C. for 10 seconds. As shown in FIG. 15, different cure parameters have little effect on the corrosion resistance.

Example 8

Aluminum alloy sheets were treated according to the methods described in Example 2. Formulation 3 was applied onto a sheet with a roll coater and cured. A non-treated sample was tested for comparison purposes.

Figure 16:
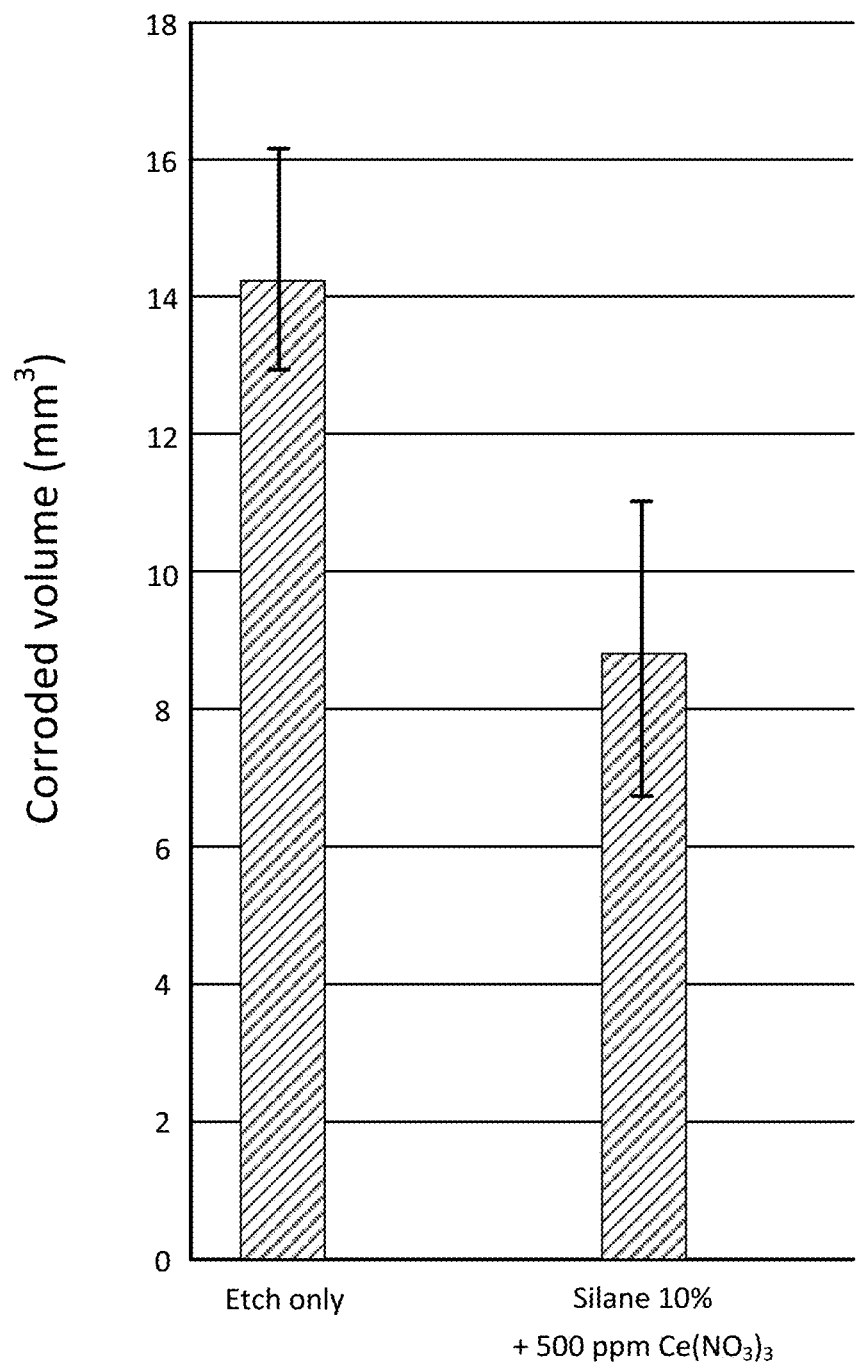
FIG. 16 is a graph showing effects of the silane and cerium system compared to a non-pretreated aluminum alloy.

FIG. 16 is a graph that presents the effect of corrosion resistance provided by the silane matrix containing $Ce(NO_3)_3$ after Formulation 3 was prepared. The treated aluminum alloy continues to exhibit corrosion resistance when compared to an untreated aluminum alloy sample.

Example 9

Aluminum alloy sheets were treated with the pretreatment compositions listed in Table 5 according to the methods described in Example 2. Formulations 18, 19, 20, 21, and 22 (Table 5) were applied onto the sheets with a roll coater and cured.

TABLE 5

| Formulation | Matrix Silane: Permatreat 1003 A (vol %) | Inhibitors | | | |
|---|---|---|---|---|---|
| | | $Ce(NO_3)_3 \cdot 6H_2O$ (ppm) | $Y(NO_3)_3 \cdot 6H_2O$ (mg/L) | $Yb(NO_3)_3 \cdot 6H_2O$ (mg/L) | HXQ (mg/L) |
| 18 | 10 | | | | |
| 19 | 10 | 1000 | | | |
| 20 | 10 | | 1000 | | |
| 21 | 10 | | | 1000 | |
| 22 | | | | | 160 |

Figure 17:
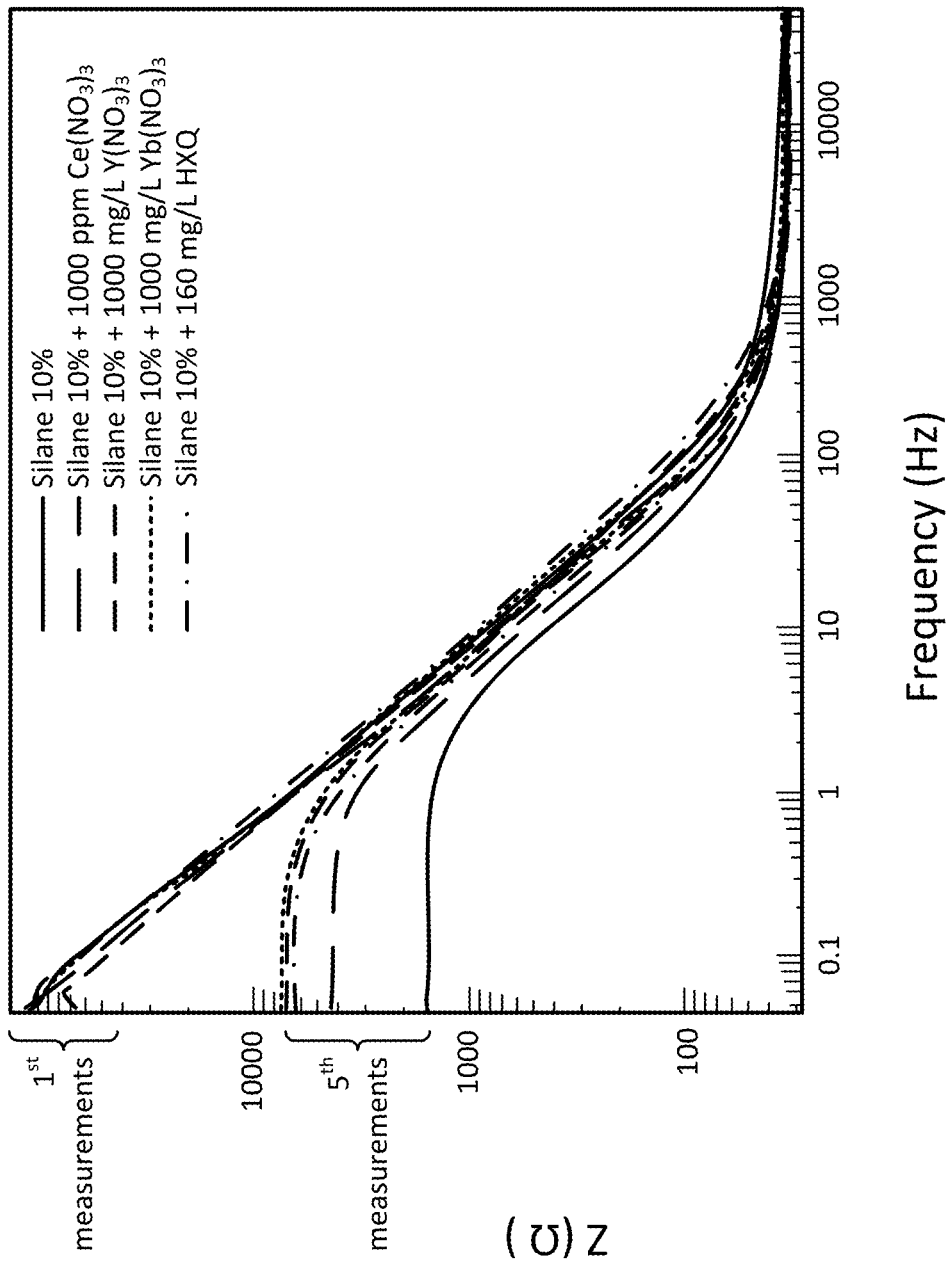
FIG. 17 is a graph of electrochemical impedance spectroscopy (EIS) measurements performed on pretreated aluminum alloy samples prepared as described herein.

Electrochemical impedance spectroscopy (EIS) coupled with alternating current direct current (ACDC) was employed to simulate galvanic corrosion on pretreatment coated aluminum alloy samples. The samples were exposed to a 0.1 M NaCl solution and EIS measurements were taken to measure the state of the pretreatment before and after degradation. The EIS measurement was performed from 0.1 Hz to $10^5$ Hz, where the amplitude of oscillation was 10 mV and the oscillation was applied around the open circuit potential (OCP) value. The sample, in solution, was polarized for five minutes at −0.6V. The polarization was removed from the sample for a relaxation period of 1 minute and then the EIS measurement was performed as described above. This process was repeated five times. FIG. 17 is a graph illustrating impedance of the sheets during electrochemical stimulation for the first EIS measurement and the fifth EIS measurement. Decreased impedance values suggest pretreatment degradation and release of rare earth metal ions as described above. Increased impedance values suggest the chemical corrosion inhibitor precipitates on areas of the corroding surface forming a barrier layer, increasing the resistivity of the aluminum alloy sheet surface. Precipitation of the chemical corrosion inhibitor onto the aluminum alloy sheet surface provides further corrosion inhibition. As shown in FIG. 17, all pretreatment coated alloys demonstrated increased corrosion resistance as compared to the alloy treated with the matrix only (silane 10 vol. %).

Example 10

Figure 18:
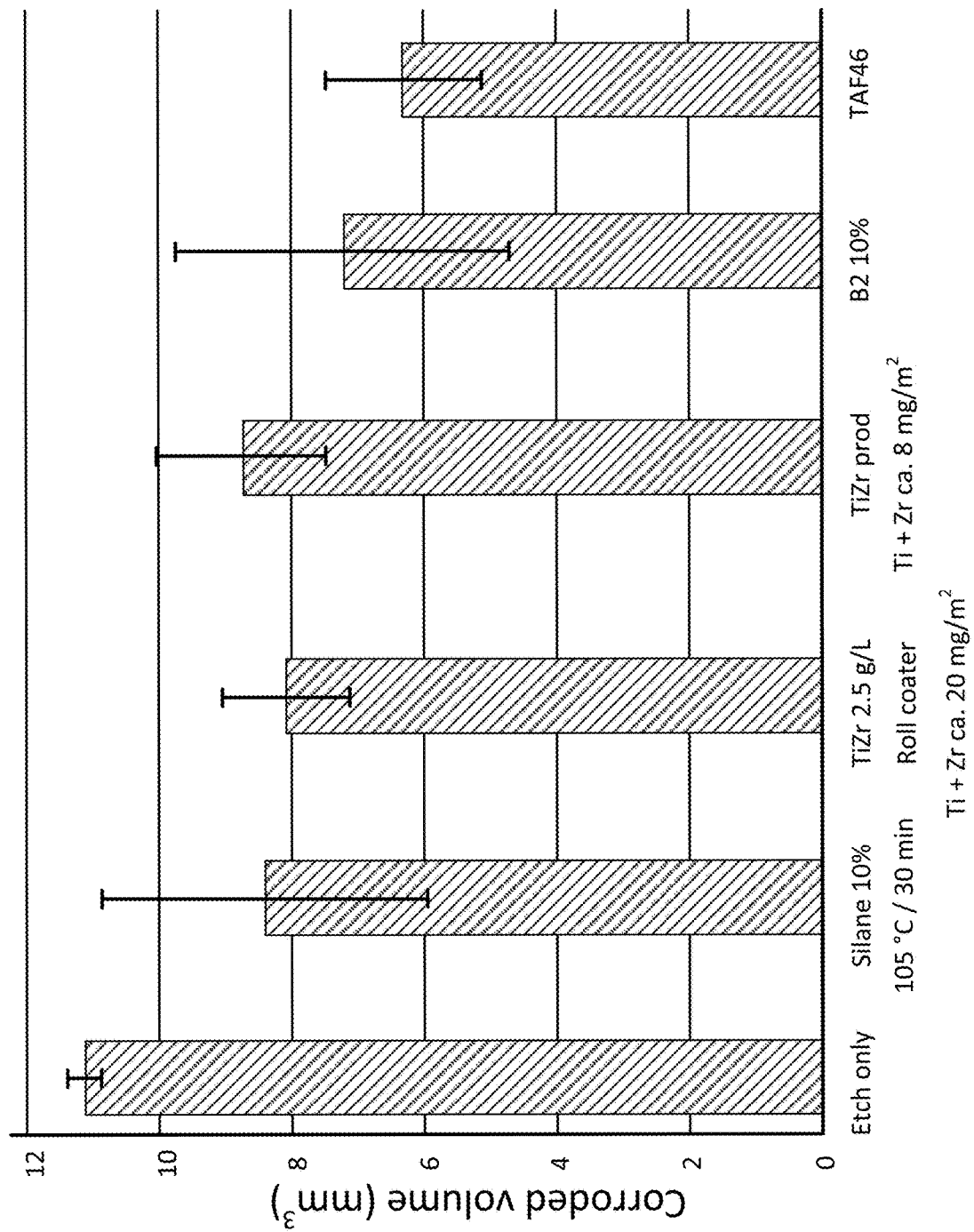
FIG. 18 is a graph showing effects of varied corrosion inhibitors in a silane matrix.

The corrosion resistances imparted by the matrices alone, without any corrosion inhibitor as described herein, were determined. Specifically, the corrosion resistances of an untreated alloy (labeled as Etch only), an alloy coated with a neat silane matrix having a silane percentage of 10 vol. % (labeled as Silane 10%), an alloy coated with a Ti/Zr matrix (20 mg/m$^2$) applied via roll coater (labeled as TiZr 2.5 g/L Roll coater), an alloy coated with Ti/Zr matrix (8 mg/m$^2$) applied on a production line (labeled as Ti/Zr prod), a film including 10 vol. % of a polyhydroxystyrene-containing compound (labeled as B2 10%), and a thin anodized film (labeled as TAF46) layer were compared (see FIG. 18). Each coated alloy displayed increased corrosion resistance as compared to the untreated alloy (etch only).

All patents, patent applications, publications, and abstracts cited above are incorporated herein by reference in their entirety. Reference has been made in detail to various embodiments of the disclosed subject matter, one or more examples of which were set forth above. Each example was provided by way of explanation of the subject matter, not limitation thereof. In fact, it will be apparent to those skilled in the art that various modifications and variations may be made in the present subject matter without departing from the scope or spirit of the disclosure. For instance, features illustrated or described as part of one example, may be used with another example to yield a still further example.

What is claimed is:

1. A pretreatment composition consisting of:
   at least one rare earth metal or salt thereof,
   a solution comprising at least one silane,
   clay particles, and
   an organic corrosion inhibitor,
   wherein the at least one rare earth metal or salt thereof is present in an amount of 50 to 7500 ppm and the solution comprising the at least one silane is present in an amount of 5 vol. % to 50 vol. %,
   wherein the clay particles are present in an amount of 50 to 5000 ppm, and
   wherein the organic corrosion inhibitor comprises mercaptobenzothiazole (MBT), salicylaldoxime, dithiooxamide, quinaldic acid, thioacetamide, 8-hydroxyquinoline (HXQ), or combinations thereof.

2. The pretreatment composition of claim 1, wherein the at least one rare earth metal or salt thereof comprises at least one of cerium, yttrium, ytterbium, and lanthanum.

3. The pretreatment composition of claim 1, wherein the at least one rare earth metal or salt thereof comprises cerium (III) nitrate.

4. The pretreatment composition of claim 3, wherein the cerium (III) nitrate is present in an amount of 500 ppm and the solution comprising the at least one silane is present in an amount of 10 vol. %.

5. The pretreatment composition of claim 1, wherein the clay particles comprise montmorillonite.

6. The pretreatment composition of claim 1, wherein the at least one silane comprises at least one of (3-aminopropyl)triethoxysilane, 1,2-bis(triethoxysilyl)ethane, glycidyl-oxy-propyl-trimethoxysilane, tetraethoxysilane, vinyltriethoxysilane, bis[3-(trimethoxysilyl)propyl]amine, vinyltrimethoxysilane, and methyltriethoxysilane.

7. The pretreatment composition of claim 1, wherein the organic corrosion inhibitor is present in an amount of 50 ppm to 5000 ppm.

* * * * *